(12) United States Patent
Mata et al.

(10) Patent No.: US 6,907,305 B2
(45) Date of Patent: Jun. 14, 2005

(54) AGENT REACTIVE SCHEDULING IN AN AUTOMATED MANUFACTURING ENVIRONMENT

(75) Inventors: Gustavo Mata, Austin, TX (US); Steven C. Nettles, Johnson City, TX (US); Larry D. Barto, Austin, TX (US); Yiwei Li, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 10/135,145

(22) Filed: Apr. 30, 2002

(65) Prior Publication Data

US 2004/0243266 A1 Dec. 2, 2004

(51) Int. Cl.⁷ .............................................. G06F 19/00
(52) U.S. Cl. ........................ 700/99; 700/100; 700/121; 705/8
(58) Field of Search ............................... 705/8; 700/99, 700/100, 121, 101

(56) References Cited

U.S. PATENT DOCUMENTS

| | | | |
|---|---|---|---|
| 4,796,194 A | | 1/1989 | Atherton ..................... 364/468 |
| 5,093,794 A | | 3/1992 | Howie et al. ................ 364/468 |
| 5,369,570 A | | 11/1994 | Parad ......................... 364/401 |
| 5,375,061 A | | 12/1994 | Hara et al. .................. 364/468 |
| 5,444,632 A | * | 8/1995 | Kline et al. ................. 700/100 |
| 5,446,671 A | * | 8/1995 | Weaver et al. .............. 700/100 |
| 5,548,535 A | | 8/1996 | Zvonar .................. 364/551.01 |
| 5,586,021 A | | 12/1996 | Fargher et al. ......... 364/468.06 |
| 5,835,688 A | * | 11/1998 | Fromherz .................. 358/1.13 |
| 5,890,134 A | | 3/1999 | Fox ................................ 705/9 |
| 5,953,229 A | | 9/1999 | Clark et al. ............. 364/468.06 |
| 6,038,539 A | | 3/2000 | Maruyama et al. ............. 705/8 |
| 6,088,626 A | | 7/2000 | Lilly et al. .................. 700/100 |
| 6,128,542 A | | 10/2000 | Kristoff et al. ............... 700/97 |
| 6,148,239 A | | 11/2000 | Funk et al. .................... 700/1 |
| 6,202,062 B1 | | 3/2001 | Cameron et al. ............... 707/3 |
| 6,263,255 B1 | | 7/2001 | Tan et al. .................... 700/121 |
| 6,356,797 B1 | | 3/2002 | Hsieh et al. ................. 700/101 |
| 6,374,144 B1 | | 4/2002 | Viviani et al. ................ 700/12 |
| 6,400,999 B1 | | 6/2002 | Kashiyama et al. ........ 700/100 |
| 6,434,443 B1 | * | 8/2002 | Lin ............................. 700/100 |
| 6,584,369 B2 | | 6/2003 | Patel et al. ................. 700/100 |

OTHER PUBLICATIONS

U.S. Appl. No. 10/331,715, filed Dec. 30, 2002, Nettles et al.
U.S. Appl. No. 10/331,598, filed Dec. 30, 2002, Barto et al.
U.S. Appl. No. 10/331,596, filed Dec. 30, 2002, Barto et al.
U.S. Appl. No. 10/284,705, filed Oct. 31, 2002, Nettles et al.
U.S. Appl. No. 10/233,197, filed Aug. 30, 2002, Barto et al.
U.S. Appl. No. 10/232,145, filed Aug. 30, 2002, Barto et al.
U.S. Appl. No. 10/231,930, filed Aug. 30, 2002, Barto et al.
U.S. Appl. No. 10/231,888, filed Aug. 30, 2002, Barto et al.
U.S. Appl. No. 10/231,849, filed Aug. 30, 2002, Barto et al.

(Continued)

Primary Examiner—Jayprakash N. Gandhi
(74) Attorney, Agent, or Firm—Williams, Morgan & Amerson, P.C.

(57) ABSTRACT

A method and apparatus for scheduling in an automated manufacturing environment, comprising are disclosed. The method includes detecting an occurrence of a predetermined event in a process flow; notifying a software scheduling agent of the occurrence; and reactively scheduling an action from the software scheduling agent responsive to the detection of the predetermined event. The apparatus is automated manufacturing environment including a process flow and a computing system. The computing system further includes a plurality of software scheduling agents residing thereon, the software scheduling agents being capable of reactively scheduling appointments for activities in the process flow responsive to a plurality of predetermined events.

53 Claims, 6 Drawing Sheets

OTHER PUBLICATIONS

U.S. Appl. No. 10/231,648, filed Aug. 30, 2002, Barto et al.
U.S. Appl. No. 10/231,561, filed Aug. 30, 2002, Barto et al.
U.S. Appl. No. 10/190,194, filed Jul. 3, 2002, Li et al.
U.S. Appl. No. 10/160,990, filed May 31, 2002, Mata et al.
U.S. Appl. No. 10/160,956, filed May 31, 2002, Li et al.
U.S. Appl. No. 10/135,145, filed Apr. 30, 2002, Mata et al.
Resende, "Shop Floor Scheduling of Semiconductor Wafer Manufacturing," *University of California*, Berkeley (1987).
Glassey et al., "Closed–Loop Job Release Control for VLSI Circuit Manufacturing," *IEEE Transactions on Semiconductor Manufacturing* 1:36–46 (1988).
"Agent–Enhanced Manufacturing System Initiative," *Technologies for the Integration of Manufacturing Applications (TIMA)* (Oct. 1997).
Ebteshami et al., "Trade–Offs in Cycle Time Management: Hot Lots", IEEE Transactions on Semiconductor Manufacturing, vol. 5, No. 2, May 1992.
"Factory Integration," *The National Technology Roadmap for Semiconductors: Technology Needs* (1997).
SALSA Enhancements for next Swarm Release (Apr. 22, 1999).
SALSA Exceptions—Minutes from May 11, 1999.
Starvation Avoidance Lot Start Agent (SALSA) (Overview: Apr. 15, 1999).
Starvation Avoidance Lot Start Agent, *Fab 25 AEMSI/SALSA Review Meeting* (May 26, 1999).
Starvation Avoidance Lot Start Agent, *Iteration 1 Requirements Kickoff* (May 3, 1999).
Van Parunak, "Review of Axtell and Epstein" (Jun. 23, 1999).
Baumgärtel et al., "Combining Multi–Agent Systems and Constraint Techniques in Production Logistics" (1996).
Bonvik et al., "Improving a Kanban Controlled Production Line Through Rapid Information Dissemination" (Jul. 10, 1995).
Burke et al., "The Distributed Asynchronous Scheduler," pp. 309–339 (1994).
Butler et al., "ADDYMS: Architecture for Distributed Dynamic Manufacturing Scheduling," pp. 199–213 (1996).
Fordyce et al., "Integrating Decision Technologies for Dispatch Scheduling in Semiconductor Manufacturing," *Logistics Management System (LMS)*, pp. 473–516 (1994).
Hynynen, "BOSS: An Artificially Intelligent System for Distributed Factory Scheduling," *Computer Applications in Production and Engineering*, pp. 667–677 (1989).
Interrante et al., "Emergent Agent–Based Scheduling of Manufacturing Systems".
Juba et al., "Production Improvements Using a Forward Scheduler" (1995).
Li et al., "Minimum Inventory Variability Schedule with Applications in Semiconductor Fabrication," *IEEE Transactions on Semiconductor Manufacturing* 9:145–149 ()1996).
Lin et al., "Integrated Shop Floor Control Using Autonomous Agents," *IIE Transactions* 24:57–71 (1992).
Lu et al., "Efficient Scheduling Policies to Reduce Mean and Variance of Cycle–Time in Semiconductor Manufacturing Plants," *IEEE Transactions Semiconductor Manufacturing* 7:374–388 (1994).
Martin–Vega et al., "Applying Just–In–Time in a Wafer Fab: A Case Study," *IEEE Transactions on Semiconductor Manufacturing* 2:16–22 (1989).

Murthy et al., "Agent Based Cooperative Scheduling," pp. 112–117 (1997).
Van Parunak et al., "Agents Do It In Time—Experiences with Agent–Based Manufacturing Scheduling" (1999).
Van Parunak et al., "Agent–Based Models & Manufacturing Processes".
Ramos et al., "Scheduling Manufacturing Tasks Considering Due Dates: A New Method Based on Behaviours and Agendas" (1995).
Shen et al., "An Agent–Based Approach for Dynamic Manufacturing Scheduling" (1998).
Hollister, "Schedule Paper #17 Summary" (Jun. 23, 1999).
Hollister, "Schedule Paper #19 Summary" (Jun. 23, 1999).
Hollister, "Schedule Paper #23 Summary" (Jun. 23, 1999).
Hollister, "Schedule Paper #32 Summary" (Jun. 23, 1999).
Vaario et al., "An Emergent Modelling Method for Dynamic Scheduling," *Journal of Intelligent Manufacturing* 9:129–140 (1998).
Wellman et al., "Auction Protocols for Decentralized Scheduling" (May 22, 1998).
Weber, "Material Traceability—The Missing Link in TAP Systems," *Test, Assembly and Packaging Automation and Integration '99 Conference*.
"ObjectSpace Fab Solutions Semiconductor Product Development Overview" (presented at SEMICON Southwest 1998).
"Agent Enhanced Manufacturing Systems Initiative (AEMSI) Project" presented by Dan Radin, ERIM CEC Nov. 12–13, 1998).
Weber, "APC Framework: Raising the Standard for Fab Automation and Integration," *Equipment Automation Conference 1hu st European Symposium on Semiconductor Manufacturing* (Apr. 14, 1999).
Wein, "Scheduling Semiconductor Wafer Fabrication," *IEEE Transactions on Semiconductor Manufacturing* 1:115–130 (1988).
Bonvik, "Performance Analysis of Manufacturing Systems Under Hybrid Control Policies" (Sep. 22, 1995).
Bonvik, "Performance Analysis of Manufacturing Systems Under Hybrid Control Policies" (Oct. 3, 1995).
Sikora et al., "Coordination Mechanisms for Multi–Agent Manufacturing Systems: Applications to Integrated Manufacturing Scheduling," *IEEE Transactions on Engineering Management* 44:175–187 (1997).
Sousa et al., "A Dynamic Scheduling Holon for Manufacturing Orders," *Journal of Intelligent Manufacturing* 9:107–112 (1998).
Upton et al., "Architectures and Auctions in Manufacturing," *Int. J. Computer Integrated Manufacturing* 4:23–33 (1991).
Fordyce et al., "Logistics Management System (LMS): An Advanced Decision Support System for the Fourth Decision Tier–Dispatch or Short Interval Scheduling,", pp. 1–58 (1994).
Gere, "Heuristics in Job Shop Scheduling," *Management Science* 13:167–190 (1966).
Ehteshami et al., "Trade–Offs in Cycle Time Management: Hot Lots," *IEEE Transactions on Semiconductor Manufacturing* 5:101–106 (1992).
Axtell et al., "Distributed Computation of Economic Equilibria via Bilateral Exchange" (Mar. 1997).

* cited by examiner

AGENT REACTIVE SCHEDULING IN AN AUTOMATED MANUFACTURING ENVIRONMENT

The United States Government has a paid-up license in this invention and the right in limited circumstances to require the patent owner to license others on reasonable terms as provided for by the terms of Award No. 70NANB7H3041 awarded by the United States Department of Commerce, National Institute of Standards and Technology ("NIST").

BACKGROUND OF THE INVENTION

1. Field of the Invention

This invention pertains to automated manufacturing environments, and, more particularly, to scheduling in an automated manufacturing environment.

2. Description of the Related Art

Growing technological requirements and the worldwide acceptance of sophisticated electronic devices have created an unprecedented demand for large-scale, complex, integrated circuits. Competition in the semiconductor industry requires that products be designed, manufactured, and marketed in the most efficient manner possible. This requires improvements in fabrication technology to keep pace with the rapid improvements in the electronics industry. Meeting these demands spawns many technological advances in materials and processing equipment and significantly increases the number of integrated circuit designs. These improvements also require effective utilization of computing resources and other highly sophisticated equipment to aid, not only design and fabrication, but also the scheduling, control, and automation of the manufacturing process.

Turning first to fabrication, integrated circuits, or microchips, are manufactured from modern semiconductor devices containing numerous structures or features, typically the size of a few micrometers. The fabrication process generally involves processing a number of wafers through a series of fabrication tools. Layers of materials are added to, removed from, and/or treated on a semiconducting substrate during fabrication to create the integrated circuits. The fabrication essentially comprises the following four basic operations:

layering, or adding thin layers of various materials to a wafer from which a semiconductor is produced;

patterning, or removing selected portions of added layers;

doping, or placing specific amounts of dopants in selected portions of the wafer through openings in the added layers; and heat treating, or heating and cooling the materials to produce desired effects in the processed wafer.

Although there are only four basic operations, they can be combined in hundreds of different ways, depending upon the particular fabrication process. See, e.g., Peter Van Zant, *Microchip Fabrication A Practical Guide to Semiconductor Processing* (3d Ed. 1997 McGraw-Hill Companies, Inc.) (ISBN 0-07-067250-4). Each fabrication tool performs one or more of four basic operations. The four basic operations are performed in accordance with an overall process to finally produce the finished semiconductor devices.

Controlling a semiconductor factory fabricating such integrated circuits, however, is a challenging task. A semiconductor factory ("fab") is a complex environment where numerous parts, typically 40,000 wafers or more, and numerous part types, typically 100 part types or more, are simultaneously being manufactured. As each wafer moves through the semiconductor factory (or, "fab"), it may undergo more than 300 processing steps, many of which use the same machines. A large factory may contain approximately 500 computer-controlled machines to perform this wafer processing. Routing, scheduling, and tracking material through the fab is a difficult and complicated task, even with the assistance of a computerized factory control system.

Efficient management of a facility for manufacturing products such as semiconductor chips requires monitoring various aspects of the manufacturing process. For example, it is typically desirable to track the amount of raw materials on hand, the status of work-in-process and the status and availability of machines and tools at every step in the process. One of the most important decisions is selecting which lot should run on each machine at any given time. Additionally, most machines used in the manufacturing process require scheduling of routine preventative maintenance ("PM") and equipment qualification ("Qual") procedures, as well as other diagnostic and reconditioning procedures that must be performed on a regular basis. These procedures should be performed such that they do not impede the manufacturing process itself.

One approach to this issue implements an automated "Manufacturing Execution System" ("MES"). An automated MES enables a user to view and manipulate, to a limited extent, the status of machines and tools, or "entities," in a manufacturing environment. In addition, an MES permits dispatching and tracking of lots or work-in-process through the manufacturing process to enable resources to be managed in the most efficient manner. Specifically, in response to MES prompts, a user inputs requested information regarding work-in-process and entity status. For example, when a user performs a PM on a particular entity, the operator logs the performance of the PM (an "event") into an MES screen to update the information stored in the MES database with respect to the status of that entity. Alternatively, if an entity is to be put down for repair or maintenance, the operator will log this information into the MES database, which then prevents use of the entity until it is subsequently logged back up.

Although MES systems are sufficient for tracking lots and machines, such systems suffer several deficiencies, the most obvious of which are their passive nature, lack of advance scheduling and inability to support highly automated factory operations. Current MES systems largely depend on manufacturing personnel for monitoring factory state and initiating activities at the correct time. For example, a lot does not begin processing until a wafer fab technician ("WFT") issues the appropriate MES command. And, prior to processing, a WFT must issue an MES command to retrieve the lot from the automated material handling system ("AMHS") with sufficient advance planning that the lot is available at the machine when the machine becomes available. If the WFT does not retrieve the lot soon enough, or neglects to initiate processing at the earliest available time, the machine becomes idle and production is adversely impacted.

These types of deficiencies in the typical automated MES emphasize the importance of the WFT in the efficient operation of the manufacturing process. WFTs perform many vital functions. For instance, WFTs initiate dispatching, transport, and processing as their attention and time permits. They make scheduling decisions such as whether to run an incomplete batch, as opposed to waiting for additional approaching lots, or performing PM or qualification procedures instead of processing lots. WFTs perform non-value added MES transactions and utilize conventional factory control systems that are passive. In this context, the term "passive" means activities in the control system must be initiated by the WFT, as opposed to being self-starting or self-initiating.

However, the presence of WFTs also inevitably introduces some inefficiencies. There typically is a large difference between the performance of the best WFT and the performance of the worst WFT. A WFT typically simultaneously monitors the processing of multiple tools and lots, making it difficult to focus on an individual lot or tool. Furthermore, the size and complexity of the modern fabrication process flows makes it exceedingly difficult for a WFT to foresee and prevent downstream bottlenecks or shortages arising from upstream activities. Shift changes, rest breaks, and days off for the WFT also create inefficiencies or machine idle time that adversely impact the manufacturing process flow. Just as the importance of the WFT is magnified by the deficiencies of the automated MES, so are the inefficiencies of the WFT magnified by his importance.

Thus, factory control systems utilized in today's wafer fabs are passive and do not enable a high degree of automation. These systems are very dependent on WFTs and other factory staff to monitor the state of the factory, to continuously react to change, to make rapid logistical decisions, and to initiate and coordinate factory control activity in a timely manner. These WFTs are agents, providing the active element that is lacking in factory control systems. As a result, factory effectiveness in the highly competitive semiconductor industry is quite dependent on the availability, productivity, skill level, and consistency of these human agents. WFTs must monitor and operate a number of tools located in various bays in a fab. They are forced to multiplex across tools, bays, material handling systems and a variety of factory control systems. As a fab's production ramps and more complex processes are introduced, it becomes more difficult to meet the increased complexity and volume without increasing staff or system capabilities. WFTs visibility of upstream and downstream operations, tool state, work-in-process and resource availability is limited.

However, key logistical decisions are frequently based on this limited and dated information, which is only partially provided by factory control systems. WFTs spend a significant amount of time interacting with systems, monitoring factory events and state changes, and performing other non-value added functions, such as MES logging. Shift changes disrupt the operation of the fab as the technicians are temporarily unable to provide required monitoring and coordination. Despite the best efforts of the technicians, utilization of tools suffer, adversely impacting other key factory metrics including cycle time, inventory levels, factory output and mix. With the need for intrabay material handling to transport 12-inch wafers in new 300 mm wafer fabs, significant additional complexity is introduced. Conventional factory control systems are not capable of providing this level of detailed scheduling and execution control.

The present invention is directed to resolving, or at least reducing, one or all of the problems mentioned above.

SUMMARY OF THE INVENTION

The invention, in its various aspects and embodiments, is a method and apparatus for scheduling in an automated manufacturing environment. In one embodiment, a method comprises detecting an occurrence of a predetermined event in a process flow; notifying a software scheduling agent of the occurrence; and reactively scheduling an action from the software scheduling agent responsive to the detection of the predetermined event. Alternative embodiments include a computing system programmed to perform this method and a computer-readable program storage medium encoded with instructions to implement this method. In still another embodiment, the invention includes automated manufacturing environment, comprising a process flow and a computing system. The computing system further includes a plurality of software scheduling agents residing thereon, the software scheduling agents being capable of reactively scheduling appointments for activities in the process flow responsive to a plurality of predetermined events.

BRIEF DESCRIPTION OF THE DRAWINGS

The invention may be understood by reference to the following description taken in conjunction with the accompanying drawings, in which like reference numerals identify like elements, and in which.

Figure 1:
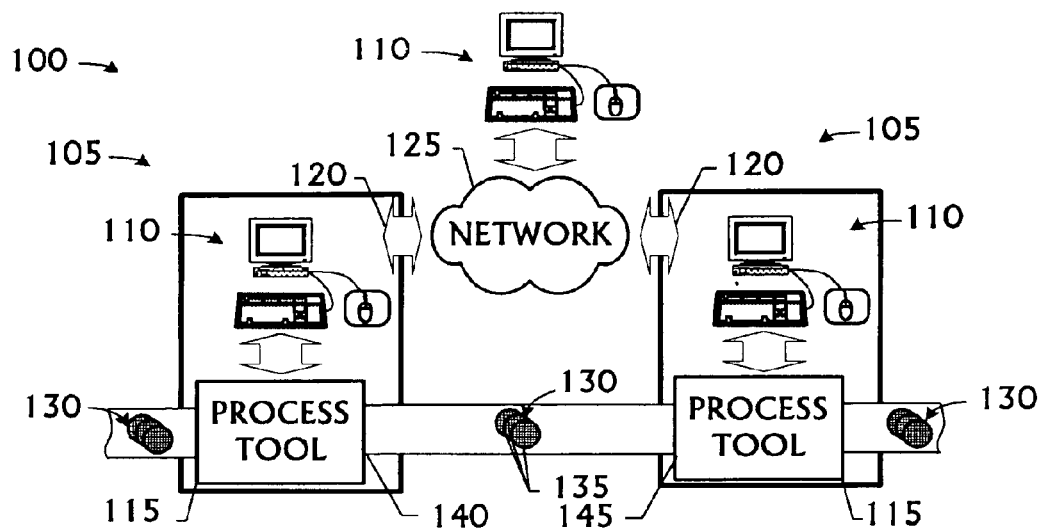
FIG. 1 conceptually depicts a portion of one particular embodiment of a process flow constructed and operated in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 1 conceptually illustrates a portion of one particular embodiment of a process flow 100 constructed and operated in accordance with the present invention. The process flow 100 fabricates semiconductor devices. However, the invention may be applied to other types of manufacturing processes. Thus, in the process flow 100 discussed above, the lots 130 of wafers 135 may be more generically referred to as "work pieces." The process tools 115 and any process operations performed thereon need not necessarily be related to the manufacture of semiconductor devices in all embodiments. However, for the sake of clarity and to further an understanding of the invention, the terminology pertaining to semiconductor fabrication is retained in disclosing the invention in the context of the illustrated embodiments.

The illustrated portion of the process flow 100 includes two stations 105, each station 105 including a computing device 110 communicating with a process tool 115. The stations 105 communicate with one another over communications links 120. In the illustrated embodiment, the computing devices 110 and the communications links 120 comprise a portion of a larger computing system, e.g., a network 125. The process tools 115 in FIG. 1 are processing lots 130 of wafers 135 that will eventually become integrated circuit devices. The process flow 100 also includes portions of a MES and an automated materials handling system ("AMHS"), neither of which is shown for the sake of clarity, and other integrated factory controls. The AMHS "handles" the lots 130 and facilitates their transport from one station 105 to another, as well as other locations in the process flow 100.

As mentioned above, the computing devices 110 may be part of a larger computing system 125 by a connection over the communications links 120. Exemplary computing systems in such an implementation would include local area networks ("LANs"), wide area networks ("WANs"), system area networks ("SANs"), intranets, or even the Internet. The computing system 125 employs a networked client/server architecture, but alternative embodiments may employ a peer-to-peer architecture. Thus, in some alternative embodiments, the computing devices 110 may communicate directly with one another. The communications links 120 may be wireless, coaxial cable, optical fiber, or twisted wire pair links, for example. The computing system 125, in embodiments employing one, and the communications links 120 will be implementation specific and may be implemented in any suitable manner known to the art. The computing system 125 may employ any suitable communications protocol known to the art, e.g., Transmission Control Protocol/Internet Protocol ("TCP/IP").

Figure 2:
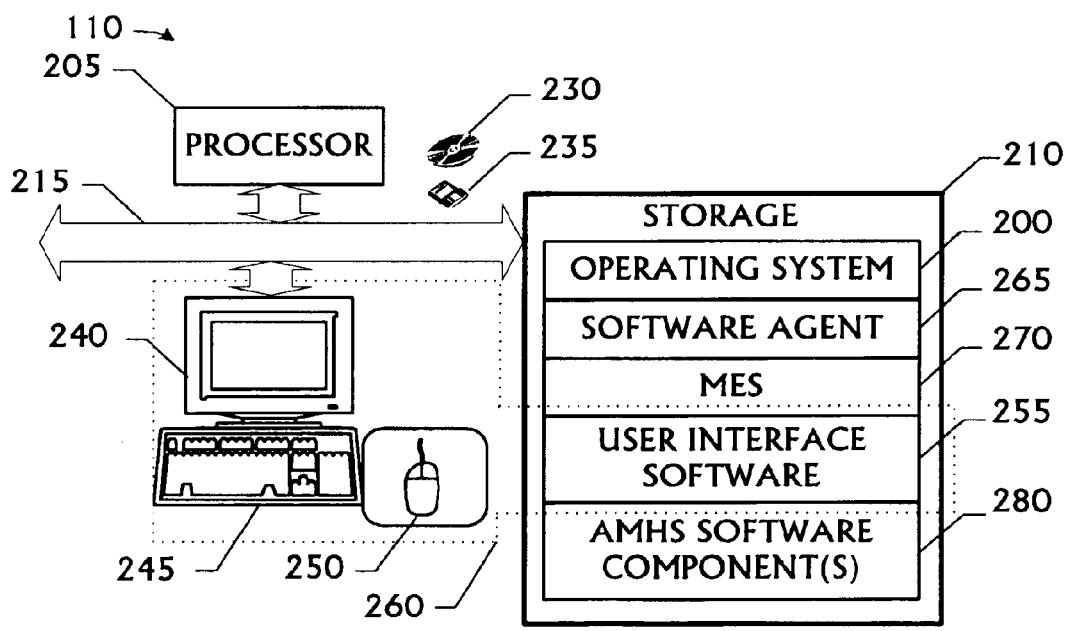
FIG. 2 conceptually depicts, in a partial block diagram, selected portions of the hardware and software architectures, respectively, of the computing devices in FIG. 1.

FIG. 2 depicts selected portions of the hardware and software architectures of the computing devices 110. Some aspects of the hardware and software architecture (e.g., the individual cards, the basic input/output system ("BIOS"), input/output drivers, etc.) are not shown. These aspects are omitted for the sake of clarity, and so as not to obscure the present invention. As will be appreciated by those of ordinary skill in the art having the benefit of this disclosure, however, the software and hardware architectures of the computing devices 110 will include many such routine features.

In the illustrated embodiment, the computing device 110 is a workstation, employing a UNIX-based operating system 200, but the invention is not so limited. The computing device 110 may be implemented in virtually any type of electronic computing device such as a notebook computer, a desktop computer, a mini-computer, a mainframe computer, or a supercomputer. The computing device 110 may even be, in some alternative embodiments, a processor or controller embedded in the process tool 115. The invention also is not limited to UNIX-based operating systems. Alternative operating systems (e.g., Windows™-, Linux™-, or disk operating system ("DOS")-based) may also be employed. The invention is not limited by the particular implementation of such features in the computing device 110.

The computing device 110 also includes a processor 205 communicating with storage 210 over a bus system 215. The storage 210 typically includes at least a hard disk (not shown) and random access memory ("RAM") (also not shown). The computing device 110 may also, in some embodiments, include removable storage such as an optical disk 230, or a floppy electromagnetic disk 235, or some other form, such as a magnetic tape (not shown) or a zip disk (not shown). The computing device 110 includes a monitor 240, keyboard 245, and a mouse 250, which together, along with their associated user interface software 255 comprise a user interface 260. The user interface 260 in the illustrated embodiment is a graphical user interface ("GUI"), although this is not necessary to the practice of the invention.

Each computing device 110 includes, in the illustrated embodiment, a software agent 265 residing in the storage 210. Note that the software agents 265 may reside in the process flow 100 in places other than the computing devices 110. The situs of the software agent 265 is not material to the practice of the invention. Note also that, since the situs of the software agents 265 is not material, some computing devices 110 may have multiple software agents 265 residing thereon while other computing devices 110 may not have any. Thus, there need not be a one-to-one correspondence between the computing devices 100 and the process tools 115. Software component(s) 270, 280 of an automated MES, such as WORKSTREAM™, and of an AMHS, respectively, also reside on at least one computing device 110. As with the software agent(s) 265, the software components 270, 280 may reside anywhere within the process flow 100.

Referring now to FIG. 1 and FIG. 2, the software agents 265 each represent some "manufacturing domain entity," e.g., a lot 130, a process tool 115, a resource, a PM, or a Qual. A process tool 115 may be a fabrication tool used to fabricate some portion of the wafers 135, i.e., layer, pattern, dope, or heat treat the wafers 135. Or, the process tool 115 may be a metrology tool used to evaluate the performance of various parts of the process flow 100. The software agents 265, collectively, are responsible for efficiently scheduling and controlling the lots 130 of wafers 135 through the fabrication process. In furtherance of these objectives, the software agents 265 interface with the software components 270, 280 of the MES and AMHS, respectively, and are integrated with other existing factory control systems (not shown). The software agents 265, where appropriate, also interface with the process tools 115 and other equipment through a software implemented "equipment interface" ("EI") (not shown). As will be apparent to those skilled in the art having the benefit of this disclosure, the manner in which this interface and integration occurs is implementation specific, depending upon the makeup and configuration of the MES, the AMHS, and the other factory control systems.

Of particular interest to the present invention, the software agents 265 reactively schedule, initiate, and execute activities on behalf of their respective manufacturing domain entities. In the illustrated embodiment, the software agents 265 also proactively schedule activities. Collectively, the software agents 265, among other things, schedule ahead for each lot 130 one or more operations on a specific qualified process tool 115, including transports and required resources, as discussed further below. This includes making optimizing decisions such as running an incomplete batch, as opposed to waiting for an approaching lot 130, and scheduling opportunistic preventive maintenance ("PM") procedures or qualification tests ("Quals") to meet specifications. The software agents 265 schedule and initiate activities such as lot transport and processing; perform MES transactions; monitor processing and transport; and react to unscheduled activities or deviations from scheduled activities. Furthermore, in the illustrated embodiment, the software agents 265 are configurable in a manner that allows a user to influence their behavior in order to tune the performance of the process flow 100.

In the illustrated embodiment, the scheduling agents 265 are typed by the manufacturing domain entities they represent. There may be many different types of scheduling agents 265, depending on the implementations. The principle types of scheduling agents 265 in the illustrated embodiment, shown in FIG. 3, include:

- a Lot Scheduling Agent ("LSA") 305 that schedules activities on behalf of lots 130 of wafers 135;
- a Machine Scheduling Agent ("MSA") 310 that schedules activities on behalf of process tools 115;
- a PM Scheduling Agent ("PMSA") 315 that schedules activities on behalf of PMs and Quals (not shown); and
- a Resource Scheduling Agent ("RSA") 320 that schedules activities on behalf of resources (not shown).

However, other types may be employed in addition to, or in lieu of, those shown. The roles and functions of each of these of scheduling agents 265 in the illustrated embodiment will be more fully discussed below.

Some of these activities are scheduled reactively, i.e., in response to events occurring in, e.g., the process flow 100, in accordance with the present invention. In one particular embodiment, this includes:

- detecting an occurrence of a predetermined event in a process flow, e.g., the process flow 100;
- notifying a subscribing software scheduling agent, e.g., the LSA 305, the MSA 310, the PMSA 315, or the RSA 320, of the occurrence; and
- reactively scheduling an action responsive to the detection of the predetermined event.

The predetermined event and the reactively scheduled action will be implementation specific. Several exemplary events and reactively scheduled actions are discussed further below.

Note that this type of reactive scheduling implies a knowledge that such events are occurring within the process flow 100. To this end, the software agents 265 respond to additional software components, not shown, known as "publishers" (or, "notifiers") and "subscribers." Agents create listeners which subscribe to one or more notifiers. Notifiers "publish" events to their subscribing listeners when changes occur within the factory. Listeners, in turn, call their subscribing software agent 265. For example, when a MSA is created, the agent will create a machine listener that subscribes to specific machine events. The MSA is interested in receiving any changes that occur to a particular machine. For example, if the availability of the machine changes, the publisher will publish the event to all of its listeners. The machine listener will then notify the subscribing MSA about the event. The subscribing MSA will then react appropriately.

More particularly, when the software agents 265 are created, they create listeners and subscribe to published events by adding the listeners to the event publisher. Listeners enable the software agents 265 to react to events in the process flow 100 in an appropriate manner. Table 1, below, lists the relevant software agents 265 employed in the illustrated embodiment, the listeners they create, and a description of their function. Note that the use of publishers and subscribers via listeners and notifiers in this manner is known to the art, and any suitable technique may be employed.

TABLE 1

Software Agents and Associated Listeners

| Software Agent | Associated Listeners | Reason for Subscribing |
| --- | --- | --- |
| RSA (e.g., a resource loading agent) | Equipment Event Listener | Listens to events from the Equipment Interface. Events may include loading started, charging started, loading completed, charging completed, etc. |
| | Machine Listener | Listens to MES events that occur on the machine. For example, it listens when a machine is not available and reacts appropriately. |
| | Process Operation Listener | Listens to changes within a process operation since it might change the processing capability of a machine. |
| | Process Listener | Listens to changes within a process since it might change the processing capability of a machine. |
| | Alarm Listener | Listens to alarms that have been set at start or end times for scheduled activities. |
| | Schedule Advertisement Listener | Listens to "advertised" time slots for scheduled appointments that have not started. |
| | Appointment State Change Listener | Listens to any corresponding appointments on scheduling calendars of other agents that might affect its calendar. |

TABLE 1-continued

Software Agents and Associated Listeners

| Software Agent | Associated Listeners | Reason for Subscribing |
|---|---|---|
| LSA | Alarm Listener | Listens to alarms that have been set at start or end times for scheduled activities. |
|  | Lot Listener | Listens to MES events that occur on the lot, such as product change, priority change, wafer count, and so on. |
|  | AMHS Listener | Listens to changes in the location of the lot of represented by the LSA. |
|  | Appointment State Change Listener | Listens to any corresponding appointments on scheduling calendars of other agents that might affect its calendar. |
| MSA | Alarm Listener | Listens to alarms that have been set at start or end times for scheduled activities. |
|  | Process Operation Listener | Listens to changes within a process operation since it might change the processing capability of a machine. |
|  | Machine Listener | Listens to MES events occurring on the machine. For example, it listens when a machine is not available. |
|  | Appointment State Change Listener | Listens to any corresponding appointments on scheduling calendars of other agents that might affect its calendar. |
|  | Chamber Listener | Listens to MES events that occur at chamber level, such as downtime, PM, or Quals. |
|  | Process Listener | Listens to changes within a process since it might change the processing capability of a machine. |
|  | Equipment Event Listener | Listens to events from the Equipment Interface. Events may include carrier arriving at the machine port, processing started, processing near complete, carrier departed, etc. |
| PM Scheduling Agent ("PMSA") | Chamber Listener | Listens to MES events that occur at chamber level, such as downtime, PM, or Quals. |
|  | Machine Listener | Listens to MES events that occur on the machine. For example, it listens when a machine is not available. |
|  | Qual Collection Listener | Listens to any new Quals or deleted Quals. |
|  | PM Collection Listener | Listens for any new PMs or deleted PMs. |
|  | Appointment State Change Listener | Tracks changes to any appointments that might affect his calendar. |

Figure 5:
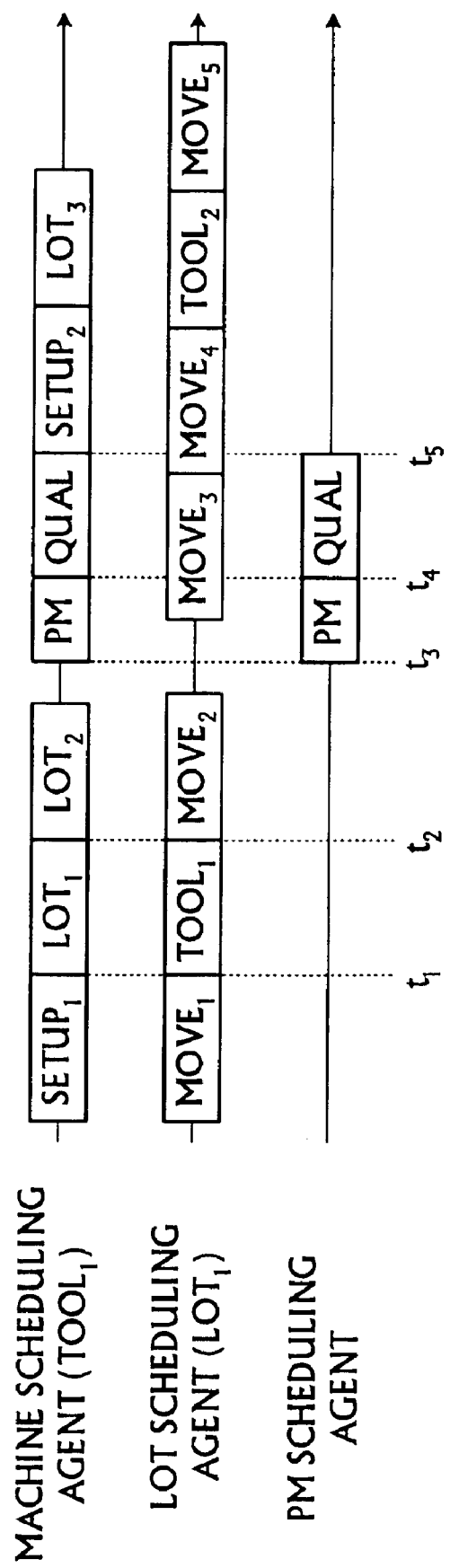
FIG. 5 conceptually illustrates three related calendars of booked appointments.

As is evident from Table 1, the software agents 265 listed therein listen to appointment changes that might affect their calendar. Consider, for example, FIG. 5 (discussed in more detail below) in conjunction with Table 1. FIG. 5 illustrates different appointments (SETUP$_1$, LOT$_1$, MOVE$_1$, TOOL$_1$, PM, QUAL, etc.) that are contained within the calendars for each of several agents (the MSA for TOOL$_1$, the LSA for LOT$_1$, a PMSA, and a RSA). FIG. 5 also illustrates corresponding appointments between those calendars. For example, the MSA calendar contains a processing appointment LOT$_1$ that corresponds with the processing appointment TOOL$_1$ on the LSA calendar. These two appointments are actually for the same event (i.e., the processing of LOT$_1$ on TOOL$_1$) made by two different entities (i.e., the MSA and the LSA, respectively) for two different entities (i.e., the lot LOT$_1$ and the processing tool TOOL$_1$).

Figure 3:
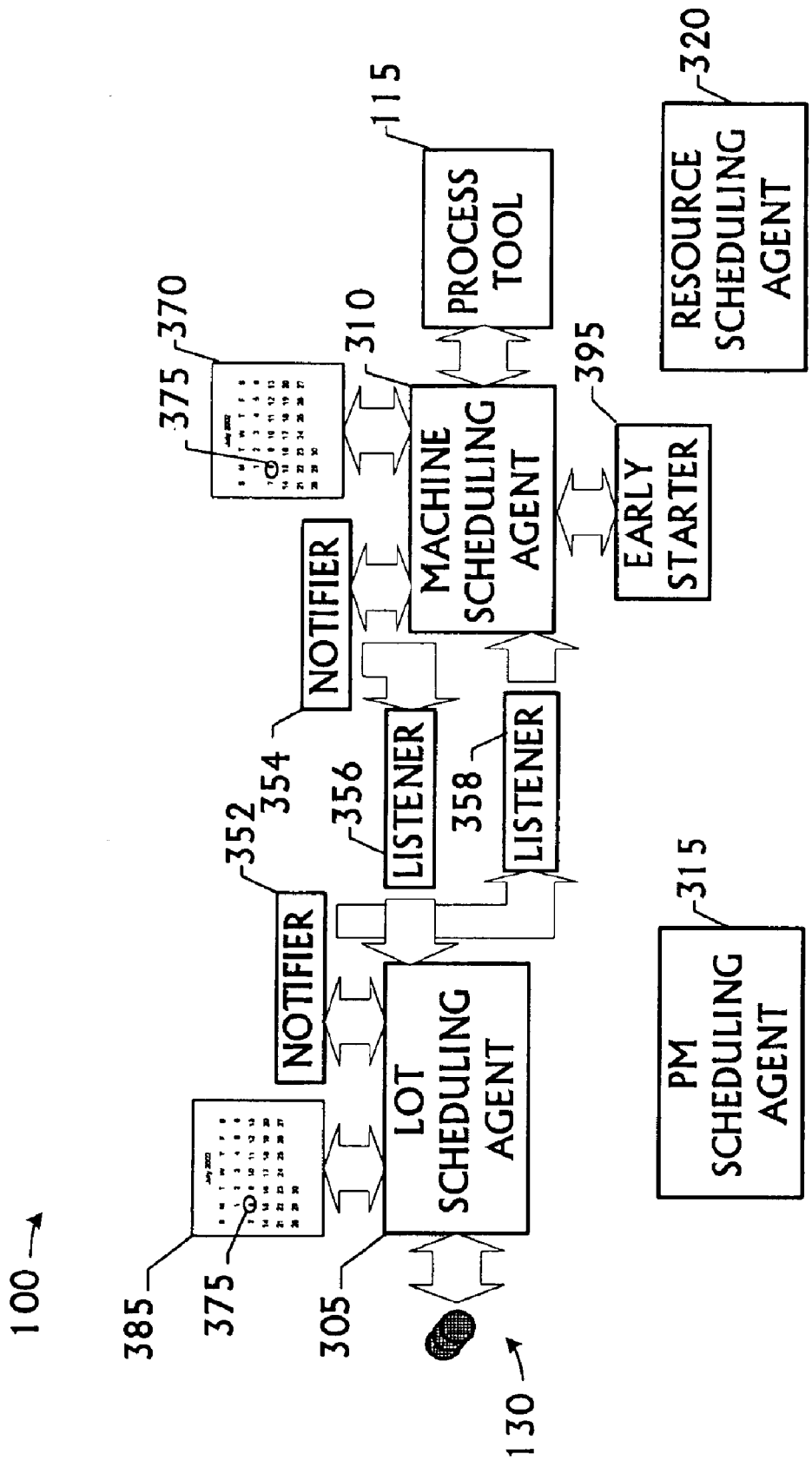
FIG. 3 conceptually depicts one particular implementation of the apparatus of FIG. 1, i.e., in a portion of a process flow from a semiconductor fabrication facility, and the manner in which it schedules appointments for the consumption of resources.

Referring now to both FIG. 3 and FIG. 5, when corresponding appointments (e.g., LOT$_1$, TOOL$_1$) are created, the appointments themselves may contain a collection of listeners, e.g., the listeners 356, 358 in FIG. 3. Listeners are added to the appointment when other software agents 265 want to be notified that the appointment has changed. In this case, the lot processing appointment LOT$_1$ on the MSA calendar 370 contains a listener 356 that notifies the LSA 305 through a notifier 354 when the processing appointment LOT$_1$ changes. On the other hand, the lot appointment TOOL$_1$ contains a listener 358 that notifies the MSA 310 through a notifier 352 when it changes. If the MSA 310 changes the processing appointment LOT$_1$, the LSA 305 will be notified of the appointment change and it will modify the appointment TOOL$_1$ accordingly. Thus, listeners enable the software agents 265 to synchronize the corresponding appointments. Also, the software agents 265 can schedule reactively to such predetermined events when appropriate and can then keep their calendars updated as changes are instituted by other software agents 265.

When the software agents 265 react to appointment changes, they carefully manipulate the corresponding appointments. In some cases, it would be inappropriate for two software agents 265 to manipulate their respective corresponding appointments at the same time. Thus, a single software agent 265 is responsible for manipulating its respective corresponding appointment, which will then prompt the software agent 265 of the corresponding appointment to manipulate its respective corresponding appointment. For example, in FIG. 5, the LSA 305 contains a move appointment $MOVE_1$ followed by the lot processing appointment $TOOL_1$. If the end time for the move appointment $MOVE_1$ arrives but the appointment is not finished, an alarm listener notifies the LSA 305. ("Alarms" are one type of event listened for, and are discussed further below.) The LSA 305 then expands the duration of the move appointment $MOVE_1$ by a configurable amount of time, but also shifts the lot processing appointment $TOOL_1$ to accommodate the expansion of the move appointment $MOVE_1$.

At the same time, the alarm listener for the MSA 310 will notify it that the start of the lot processing appointment $TOOL_1$ has arrived. Since the LSA 305 can best determine when the lot $LOT_1$ should arrive at the process tool 115, the LSA 305 shifts the start time of the lot processing appointment $TOOL_1$ after expanding the move appointment. The MSA 310 will wait for its appointment state change listener to notify it of the shift to the lot processing appointment, will find its counterpart lot processing appointment, and shift it accordingly. In this circumstance, the MSA 310 will ignore its own start time alarm. Although not shown, the lot 130, process tool 115, resources, and PMs and Quals all have corresponding "processing" agents, also not shown, that are notified by the scheduling agents when significant events occur that may require processing.

Figure 4:
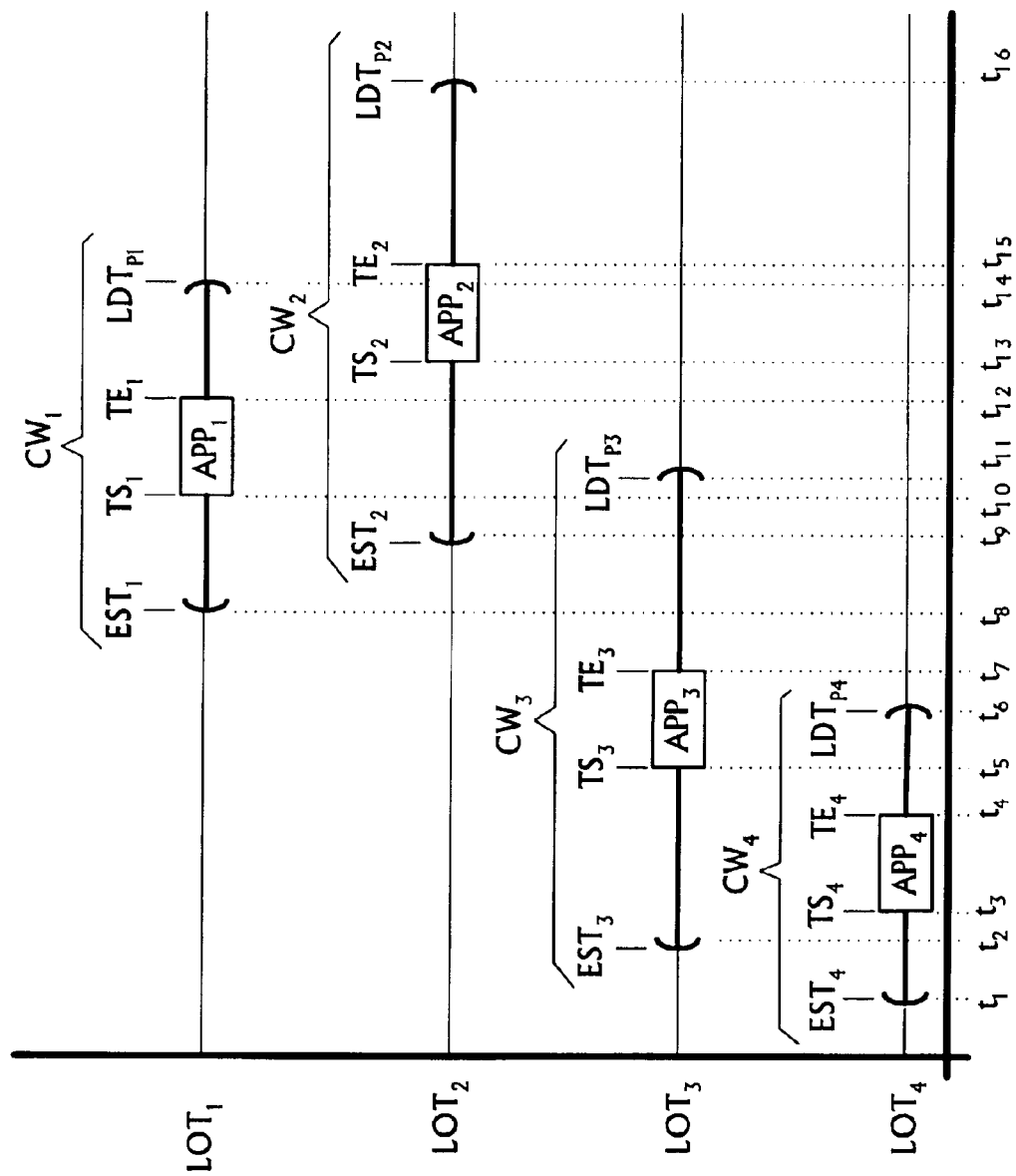
FIG. 4 conceptually depicts a calendar of booked appointments.

In furtherance of their proactive and reactive scheduling duties, the software agents 265 maintain calendars, such as the calendar conceptually illustrated in FIG. 4, of scheduled "appointments." FIG. 4 conceptually illustrates a calendar containing information concerning appointments for, e.g., a process tool 115 for a number of lots 130. An "appointment" is a time period certain in which the process tool 115 has obligated itself to perform the process operation, and is defined by an Appointment Start Time ("TS") and an Appointment End Time ("TE"). In the illustrated embodiment, the appointments are booked within "commitment windows" ("CW"), or time windows defined by an Earliest Start Time for processing ("EST") and a Latest Delivery Time ("$LDT_P$"). The client lot 130 commits to arrive at the process tool 115 no later than the EST and the process tool 115 commits to complete the processing no later than the LDT. Note, however, that the use of commitment windows are not necessary to the practice of the invention.

In FIG. 4, the process tool 115 has booked appointments $APP_1$–$APP_4$ for lots $Lot_1$–$Lot_4$, respectively. Thus, the calendaring information for $Lot_1$-$Lot_4$ is as follows:

$Lot_1$: $APP_1[t_{10}, t_{12}]$, $CW_1[t_8, t_{14}]$
$Lot_2$: $APP_2[t_{13}, t_{15}]$, $CW_2[t_9, t_{16}]$
$Lot_3$: $APP_3[t_5, t_7]$, $CW_3[t_2, t_{11}]$
$Lot_4$: $APP_4[t_3, t_4]$, $CW_4[t_1, t_6]$

Note that, in the illustrated embodiment, several of the commitment windows overlap, but none of the appointments overlap. Appointments may be shifted within their commitment window, so long as they do not overlap other appointments, or may be expanded, shrunk, canceled and rescheduled as is discussed more fully below. However, in some embodiments, parts of the appointments may overlap.

Thus, returning to FIG. 3, appointments, e.g., the processing appointment 375, are proactively booked on calendars, e.g., the calendars 385, 370, maintained by each scheduling agent, e.g., the scheduling agents 305, 310. Note, however, that not all appointments are processing appointments. Whenever the processing appointment 375 is booked, the LSA 305 schedules move appointments for moving the lots 130 to the location of the newly booked processing appointment 375. For instance, referring to FIG. 1 again, assume the lots 130 processing on the first process tool 115 exits from a port 140 and needs to arrive at the port 145 of the second process tool 115 for the scheduled processing appointment 375. Each LSA 305 schedules the appointments for the lot 130 to transit between the source and destination locations, e.g., the port 140 of the first process tool 115 and the port 145 of the second process tool 115.

FIG. 5 conceptually illustrates three related calendars maintained for three different types of entities—a lot 130, a process tool 115, and a preventive maintenance ("PM")—on which different types of appointments are booked. In the illustration of FIG. 5, as opposed to the illustration of FIG. 4, all appointments for a given calendar are collapsed onto a single timeline. The commitment windows for each appointment are omitted to facilitate this collapse and to keep from unduly cluttering the illustration. More particularly, FIG. 5 illustrates:

a calendar for a process tool $TOOL_1$ maintained by a MSA for the process tool $TOOL_1$, including appointments booked for setups (e.g., $SETUP_1$, $SETUP_2$); lot processing appointments (e.g., $LOT_1$, $LOT_2$, $LOT_3$); PMs (e.g, PM); and Quals (e.g., QUAL);

a calendar for a lot $LOT_1$ maintained by a LSA for the lot $LOT_1$ on which are booked appointments for moves (e.g., $MOVE_1$, $MOVE_2$, $MOVE_3$, $MOVE_4$, $MOVE_5$) and lot processing appointments (e.g., $TOOL_1$, $TOOL_2$); and a calendar for a PM maintained by a PMSA on which are booked appointments for PMs (e.g., PM), and Quals (e.g., QUAL).

Still other types of appointments may be booked. For instance, if the process tool $TOOL_1$ goes down, i.e., is no longer available for processing, a "downtime appointment" may be booked on its calendar to represent the expected repair time. Note that each of these appointments in the calendar of FIG. 5 is for an event that, in the first instance, the software agents 265 proactively schedule according to the manufacturing domain entity they represent.

An appointment, e.g., the processing appointment 375 in FIG. 3, exists in one of several "states", or have a certain "status," at any given time. In the illustrated embodiment, the status may be:

tentative—the appointment has been created, but not booked (which is discussed further below);

unready—the tentative appointment has been booked, but is not ready for execution;

ready—the lot 130 involved in the appointment has arrived at the process tool 115 for which it is booked;

active—the start time for the appointment has arrived and all participants are ready;

active PM/Qual—the start time for a following Qual portion of a PM appointment has arrived;

processing—the scheduled activity has started, i.e., the start command has been confirmed by the process tool 115, or the PM or Qual has started;

processing PM/Qual—the follow-up Qual portion of a PM has started;

near complete—the appointment is nearing completion as defined by predetermined parameters (e.g., processing time remaining, wafer count);

complete—processing is completed;

canceled—booked appointment is removed from a calendar before it enters the processing status; and aborted—appointment was stopped during processing in a processing status.

A tentative appointment remains tentative until it is booked, whereupon it enters the unready status. The appointment is unready until the lot 130 arrives at the process tool 115. The appointment is then ready until the start time for the appointment arrives. The appointment then becomes active (i.e., the appointment commences) until the process tool 115 confirms it has started processing. Once the appointment is processing, it retains that status until it nears completion and then is complete. If the appointment is removed from the calendar before entering the processing state, it is "canceled" and removed from the system. Once in the processing status, the appointment is "aborted" if halted. A completed appointment or an aborted appointment retains this status until it is removed from the system.

However, in accordance with the present invention, the software agents 265 also reactively schedule events for their respective manufacturing domain entities resulting from developments in the process flow 100. Typically, reactive scheduling by the software agents 265 effects changes to appointments that were, in the first instance, proactively scheduled. However, this is not necessary to the practice of the invention. For instance, in one particular embodiment, the software agents 265 schedule activities in reaction to a machine failure which causes the machine to stop processing and requires a period of downtime in order to repair the machine. There usually would not be any proactively scheduled appointment for such an event since a machine failure usually cannot be predicted in advance.

More particularly, the software agents 265 usually react to different events that occur within the process flow 100. These events are identified beforehand, i.e., are "predetermined," so that appropriate activities in reaction to those events can be defined. The appropriate actions will depend on a number of factors including not only the type of manufacturing domain involved, but also the type of event that is involved. The predetermined events are categorized, in the illustrated embodiment, as one of three types: appointment state change, a factory state change, or an alarm event.

Appointment state changes usually occur when a software agent 265, e.g., the scheduling agents 305, 310 change an appointment, e.g., the processing appointment 375. A software agent 265 may change the status of the appointment, expand or shrink the appointment, cancel the appointment, shift the appointment, or perform other manipulations to the calendar or appointments on the calendar. When an appointment is changed, the appropriate agents 265 react to the change. For example, the MSA 310 may expand the scheduled duration of the appointment 375 on its calendar 370 due to the appointment 375 running late. The LSA 305 reacts to that change by expanding the corresponding appointment 375 on its calendar 385 to keep the appointments 375 synchronized across the two calendars 370, 385. Appointment state changes may include, for instance, appointment cancellations, appointment expansions, appointment shrinkage, appointment aborts, appointments changing status, appointments shifting, and commitment window updates.

Factory state changes usually occur when the state of the factory, e.g., the process flow 100, changes. Factory state change events may originate from the MES 270 (shown in FIG. 2), the AMHS 280 (also shown in FIG. 2), or from the Equipment Interface ("EI", not shown) for the process tools 115. Factory state changes may include lot due date changes, a lot being put on hold, changing the process or process operation of a lot, a lot's location changing, a carrier arriving at a machine port, etc. For every factory state change that is a "predetermined event," the software agents 265 react accordingly. Exemplary factory state changes might include a downtime occurrence; a machine becoming available; a PM/Qual being detected; a chamber going down; a lot departing a machine; a move completed; and a wafer completed.

Alarm events occur, in this particular embodiment, when a specific alarm has expired. Agents react when an alarm event is received—for example, when the appointment end time has arrived for a lot appointment. If the machine agent does not receive notification that the appointment has ended, the machine agent will expand the appointment based on a configurable percentage of the appointment's total duration. Once the appointment is expanded, the machine agent will set a new alarm for the new, predicted end time of the appointment. An alarm event might be, for instance, an alarm firing for an appointment start time or an alarm firing for an appointment end time.

Note that some events are unplanned, or unexpected. For instance, there is no reliable way to actually know when a machine or chamber goes down unless it is going down for a scheduled PM or a Qual period. Some of these events are expected. For instance, the time at which a lot 130 arrives at the port 145 of the process tool 115 should be known if it arrives on time since the move was scheduled. Some embodiments may therefore choose not to schedule reactively to such an event, instead preferring to schedule proactively on the assumption the schedule will be met and scheduling reactively only if the schedule is not met. Note that other embodiments may schedule reactively to events not listed either in addition to or in lieu of those set forth herein.

The reactive scheduling performed upon the occurrence of any particular event will depend on the nature of the event and, to some degree, upon the particular implementation. Generally speaking, the reactive scheduling typically includes changing appointments, e.g., the appointment 375 in FIG. 3, previously scheduled and booked. Booked processing appointments and PM/Qual appointments may be shifted, expanded, aborted, shrunk, canceled, and re-scheduled. Move and setup appointments are modified as needed at the time lot processing appointments are modified. In the illustrated embodiment, these appointment modifications are performed by the LSA 305 or the MSA 310.

For example, booked processing appointments may be shifted, which may cause booked move appointments to be canceled, aborted, or rescheduled. Appointments are viewed as "beads on a string". Existing appointments are permitted to slide backward or forward in time (i.e., "right" or "left" in FIG. 4 and FIG. 5) within their respective commitment windows as desired to accommodate changes in scheduling. In the illustrated embodiment, to simplify the logic, appointments are not permitted to shift past the next appointment in either direction.

Consider the circumstance where a lot processing appointment for a lot 130 completes earlier than expected. This provides an opportunity for the MSA 310 to reactively schedule what is known as an "early start." Because the MSA 310 in FIG. 3 is idle, the MSA 310 will attempt to shift the next appointment to an earlier start time and start it immediately. When the lot 130 completes the processing appointment early, the MSA 310 reacts by shifting subsequent scheduled appointments earlier in time to take advantage of the early start opportunity. The LSA 305 will react differently to the event of the lot processing completing early.

Figure 6A:
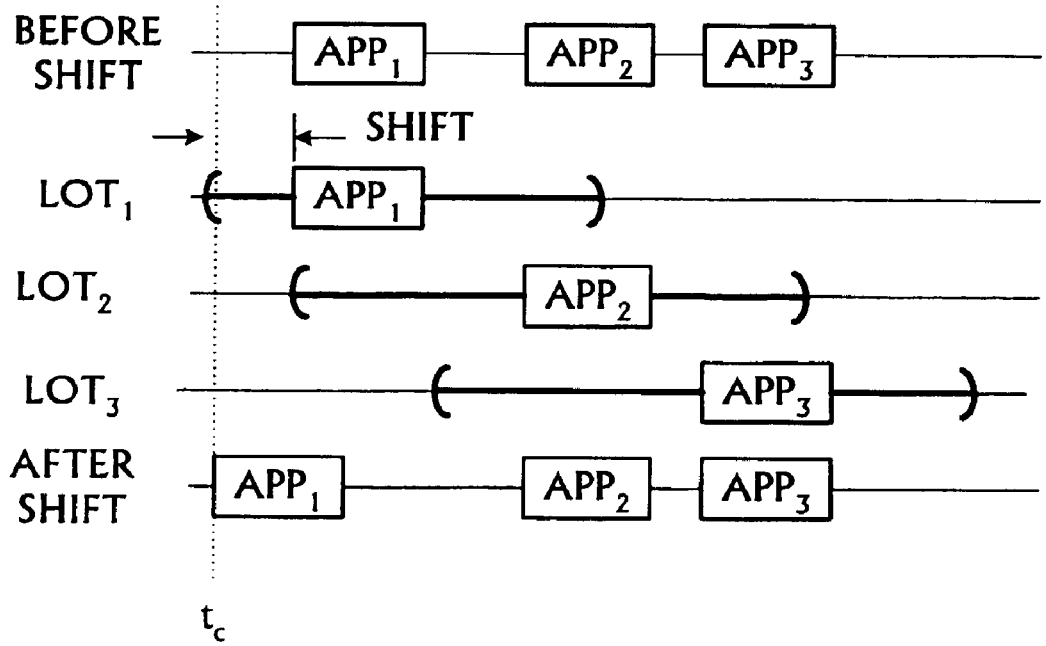
FIG. 6A and FIG. 6B conceptually illustrates the changing of booked appointments to take advantage of early start times.
Figure 6B:
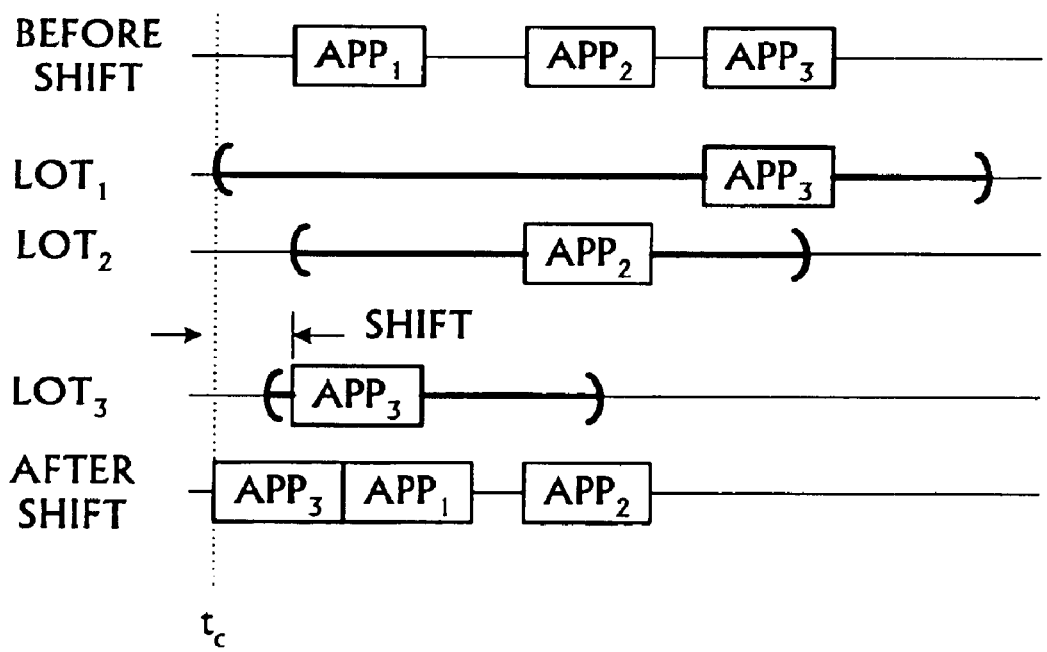

This instance is shown in FIG. 6A, wherein the current time $t_c$ falls within the commitment window $CW_1$ for the next appointment $APP_1$. The next appointment $APP_1$ is then shifted left, or earlier in time, so that its processing can begin immediately. If the next booked appointment cannot be shifted to start at the current time, the MSA 310 will search for any other booked appointments that may have commitment windows starting at the current time or earlier. If one of these booked appointments can be moved to start immediately without causing cancellation of any other booked appointments, the booked appointment will be moved in a "jump over" fashion and other booked appointments will be shifted as required. This scenario is shown in FIG. 6B, wherein the current time $t_c$ at which the provider is idle is outside the commitment window $CW_1$ for the next booked appointment $APP_1$, but falls within the commitment window $CW_3$ of the third booked appointment $APP_3$. Hence, the third appointment $APP_3$ performs a "jump over" operation, jumping over appointments $APP_1$ and $APP_2$ and appointment $APP_1$ is shifted right to a later start time immediately following appointment $APP_3$.

In either situation, the LSAs 305 for the affected lots 130 are notified by that their appointments have been changed. The difference in start times and end times may also change the appropriateness of scheduled moves. For instance, if a booked appointment is shifted left, the earlier start time means the lot 130 must arrive earlier than may be provided for by the currently scheduled moves. Conversely, a later start time means the lot 130 should move later. In either circumstance, modified moves may be appropriate to achieve the correct arrival time for the lot 130.

Consider also the circumstance where the software agents 265 reactively schedule because the duration of a current appointment, or an appointment immediately preceding it, is longer than expected. When the LSA 305 and MSA 310 book appointments, they set an "end-time alarm" (not shown) that notifies them when the appointment is scheduled to be completed. When the task is completed, the scheduling agents 305, 310 are notified and these alarms are canceled. Thus, if the alarm fires, then the scheduling agents 305, 310 know the appointment did not complete at the scheduled time, and that the appointment needs to be expanded.

Figure 7A:
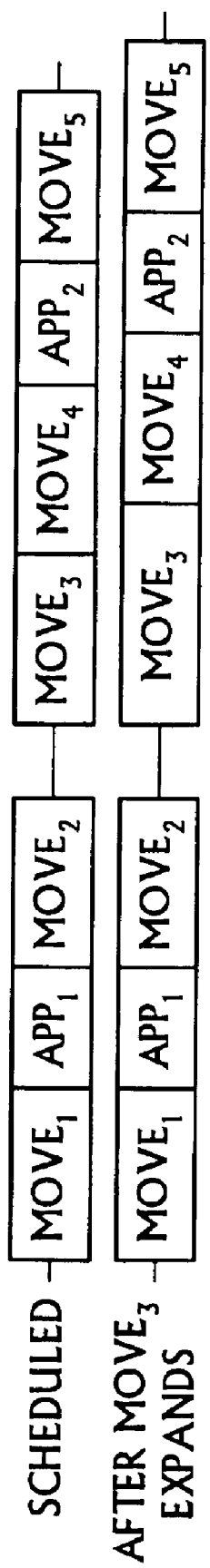
FIG. 7A and FIG. 7B conceptually illustrate two circumstances in which booked appointments are changed to accommodate unexpectedly long durations for preceding booked appointments.
Figure 7B:
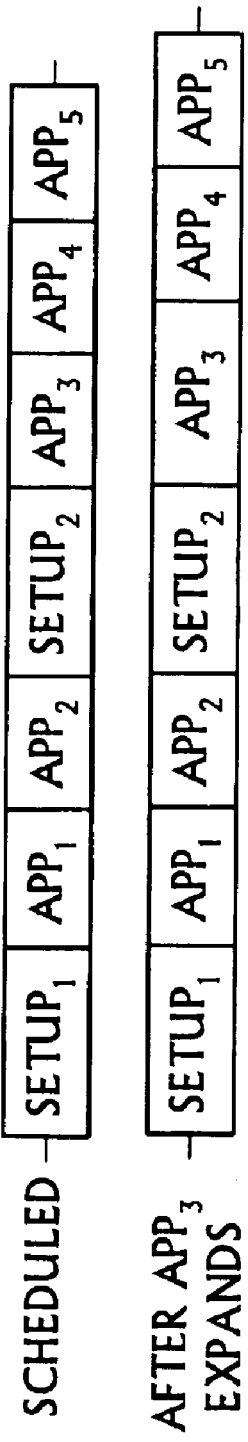

FIG. 7A and FIG. 7B illustrate two such situations. The timelines for the appointments in each have been collapsed and the commitment windows are omitted as was the case for the calendars in FIG. 5. In FIG. 7A, the move $MOVE_3$ had a longer duration than was expected, and so the moves $MOVE_4$, $MOVE_5$ and the appointment $APP_2$ were shifted later in time to accommodate this longer duration. In FIG. 7B, the appointment $APP_3$ took longer than was expected, and so the appointments $APP_4$ and $APP_5$ were shifted later in time. Note that in both FIG. 7A and FIG. 7B, the illustrated changes necessarily imply that, in both circumstances, the commitment windows for the changed appointments were wide enough to accommodate the changes. Otherwise, some appointments would have to be canceled.

As can be seen from these two examples, the reactive scheduling will vary according to the circumstance. In general, in the illustrated embodiment, the following scheduling activities may occur responsive to a predetermined event:

aborting a scheduled appointment in progress;
canceling a scheduled appointment before it begins;
scheduling a new appointment;
starting a scheduled appointment;
expanding the duration of a scheduled appointment;
shrinking the duration of a scheduled appointment;
shifting a scheduled appointment to an earlier or later time;
changing a commitment window;
changing an appointment attribute (e.g., transport start time, remaining transport time, etc.);
setting an alarm;
canceling an alarm; and
changing the status of an appointment.

The "predetermined events" provoking such reactive scheduling may include, for an appointment state change:

canceling an appointment;
expanding an appointment;
shrinking an appointment;
aborting an appointment;
an appointment changing status;
shifting an appointment;
an unexpected carrier arrival;
a transport time update;
a load time update;
an unload time update;
a lot joining a batch;
a lot leaving a batch;
canceling a lot from a batch; and
updating a commitment window.

For a factory state change, the predetermined event might be, for example:

detection of downtime;
a machine becoming available;
a PM/Qual being detected;
a chamber going down or coming up;
a change in machine capabilities;
a change in machine types;
addition of a process;
addition of a process operation;
a lot process changed;
a lot placed on hold;
a lot relesed from hold;
a lot priority changed;
a lot due date changed;
a lot wafer count changed;
a lot process operation changed, and
a lot departing from or arriving at a machine.

And, for an alarm event, the predetermined event might be:

an alarm firing for an appointment start time; and
an alarm firing for an appointment end time.

Note that these lists are not exhaustive, but illustrative only. The identity of predetermined events will be implementation-specific, and so may vary among embodiments. Typically, depending on the event provoking the reactive scheduling, these activities will be employed in combination, or in the alternative, conditionally. Tables 2–5 list the predetermined events, their type, and their reactive scheduling activities for machine, lot, PM, and resource scheduling agents, respectively, for one particular implementation of the present invention.

Tables 2, Table 3, and Table 5 refer one or more of load/unload operations and appointments and charge/discharge operations and appointments. As will be appreciated by those skilled in the art having the benefit of this disclosure, some process tools 115 perform lot batch process operations in which multiple lots 130 are simultaneously processed in a batch. Some of these process tools 115 use load, charge, discharge and unload steps. For instance, a process tool 115 may first load all the batch participants, i.e., lots 130, from the tool I/O ports (not shown) to the tool internal stocker (also not shown). Usually this type of process tool 115 has multiple I/O ports, and the load/unload operations are also performed in batches. After all the batch participants are loaded, the process tool 115 performs a batch charge operation to move the batch participants from the internal stocker into, e.g., a furnace tube (not shown) before the processing can actually begin. After the process tool 115 completes the batch process operation, it discharges the batch participants, e.g., from the furnace tube back into the internal stocker. Finally when the lots 130 are ready to be moved to the tool I/O ports, a sequence of batch unload operations is performed.

Table 2 also refers to appointments that are "locked." To help prevent undesirable appointment shifting, the illustrated embodiment employs an appointment locking mechanism. Generally speaking, when a lot 130 starts its final move from a source location to a process tool 115, it is undesirable to have a new appointment jumping in front of it by canceling or shifting that appointment to the right, or later in time. To prevent this from occurring, the MSA "locks" the lot processing appointment when the lot 130 starts its final move. Note that locked appointments nevertheless sometimes do need to be shifted. For instance, assume two appointments are booked on the calendar for a particular process tool 115, and the first one is processing while the lot 130 for the second one has started the final move to the process tool 115. The second appointment is locked because it is in its "final" move to the process tool 115. If the first appointment runs long and must be expanded, the second one must first be shifted to permit the first one to expand. Thus, the locked second appointment must be shifted even though this is generally undesirable. In general, however, appointments may be "locked" in certain circumstances to prevent them from being shifted or canceled.

TABLE 2

Reactive Scheduling Activities for MSAs

| Event | Event Type | Reactive Scheduling Activities |
|---|---|---|
| Downtime Detected | Factory State Change (MES) | A downtime event may indicate the machine is currently not available for processing or that an error has occurred during processing. If the MSA detects that the machine is not currently available for processing, the MSA will abort and shrink any lot processing appointment that is processing. It will then book a downtime appointment after the aborted lot processing appointment or after the unload appointment. If the downtime event occurred due to an error during processing, the MSA will book a downtime appointment after the lot processing appointment that is processing or the unload appointment. Booked processing appointments overlapping the downtime appointment are shifted later in time, if possible, or are otherwise cancelled. |
| Machine Available Detected | Factory State Change (MES) | Any active PM, QUAL, or downtime appointments are completed. The next appointment on the machine's calendar is then shifted and started, if possible. |
| PM/Qual Detected | Factory State Change (MES) | A PM/Qual appointment is booked after any active appointments. Any booked appointments overlapping the PM/Qual appointment are shifted after the PM/Qual appointment. If any overlapping booked appointment cannot shift, it is cancelled. |
| Chamber Down Detected | Factory State Change (MES) | All unready appointments for the machine or chamber that has not started are canceled. |
| Chamber Up Detected | Factory State Change (MES) | The duration for any appointment is shrunken to the expected completion time based on the new throughput rate and shifted to the right, or later in time, if possible. |
| Lot Not At a Port At a Scheduled Start Time | Alarm State Change | If the lot has "reserved" a port with the machine, the MSA will wait until the LSA expands the move appointment. The expansion of the move appointment will cause the LSA to shift the lot appointment to the right. The MSA will then react appropriately to the shifting of the lot appointment. If the lot has not reserved the port, the appointment is cancelled. |
| Lot Arrived at Machine Port | Factory State Change (EI) | If the lot arrived at the right location, the MSA will make the appointment active if it is not a participant of a batch appointment. If the appointment is a participant of a batch appointment, the MSA will make the appointment ready. If the machine is idle and the appointment is active, the MSA will start processing the appointment. (Note: a participant of a batch appointment is made active when all of the participants have arrived at the machine.) If the lot arrived at the right machine but the wrong port, the MSA will check to see if a different lot reserved the port. If a different lot reserved the port, the MSA will assign that lot the next available port. If the appointment for the arriving lot is active, the MSA will start processing the appointment. If the lot arrived at the wrong machine, the MSA will check to see if a different lot reserved the port. If a different lot |

TABLE 2-continued

Reactive Scheduling Activities for MSAs

| Event | Event Type | Reactive Scheduling Activities |
|---|---|---|
| | | reserved the port, the MSA will assign that lot the next available port. The machine will then book an appointment for the lot just arrived. Any overlapping appointments will be shifted to a later time. If an overlapping appointment cannot shift later in time, it will be cancelled. |
| Lot Processing Appointment Running Late | Alarm State Change | If a lot processing appointment is running late, it is expanded and any overlapping booked appointments are shifted to the right, or later in time. If any overlapping booked appointment cannot shift right and the appointment is not locked, it is cancelled. If the appointment is locked and cannot shift right, the appointment's commitment window will be expanded to allow the shift to occur. |
| Lot Processing Completing Early | Factory State Change (EI) | If a lot processing appointment completes earlier than expected, the appointment is shrunk and completed and, if possible, the next appointment is shifted earlier in time. If the next appointment can shift to the current time, it will start that appointment. |
| Lot Processing Near Complete Detected | Factory State Change (EI) | The MSA calculates the remaining processing time for the lot. If it is going to finish early, the appointment is shrunken to the new end time and any following appointments are shifted left, or earlier in time. If it is going to finish late, the appointment is expanded to the new end time and any overlapping appointment are shifted to a later time or cancelled. |
| Lot Appointment Cancelled | Appointment State Change | If processing or near complete, the appointment is aborted or, if unready, simply canceled. Upon cancellation of an appointment, the next appointment is shifted earlier in time, if possible, to reduce any gaps between appointments. |
| Lot Departing Machine Port | Factory State Change (EI) | If the lot was still processing at the time of its departure, the appointment is aborted and the end time shifted earlier in time. The next appointment is shifted earlier as much as possible. |
| Shift Appointment Right | Appointment State Change | The appointment is shifted right. If it cannot be shifted right, it is canceled, unless it is locked. If it is locked, any appointment blocking the right shift are cancelled |

Table 3 refers to "feeder operations." In a partially automated fab, only a portion of the process operations may be scheduled and controlled by the software agents 265. Thus, only a subset of the process tools 115 in the fab are under the control of the software agents 265 and the fab is not fully under the control of this system. Those process operations controlled by the software agents 265 are called "control process operations." Immediately before each control process operation, a sequence of "feeder" operations can be derived from a configurable percentage of the process time of the controlled process operation. Feeder appointments are used in determining the earliest start time for an appointment being scheduled ahead. More particularly, feeder appointments are used when a LSA is scheduling ahead and the time has not yet arrived for scheduling the feeder operation with an actual process tool 115. Feeder appointments are used to represent processing activities for those feeder operations with the duration equal to the cycle time of the respective feeder operations.

Table 3 also refers to "maxMove" appointments. For a feeder operation, the specific process tool 115 that will perform the final feeder operation is not known until the lot 130 begins processing at the final feeder operation. A "maximum move" appointment represents transport activities from the last feeder process tool 115 to a controlled process tool 115. In one embodiment, the duration of the maximum move appointment is derived by the worst case transport time between the last feeder process tool station 105 and the controlled process tool station 105. When the last feeder appointment is activated, the actual process tool 115 performing the last feeder operation is known, and thus the maximum move appointment will be replaced by a move appointment or a sequence of move appointments.

Table 3 furthermore refers to a "bid request." In the illustrated embodiment, the process flow 100 employs a protocol for scheduling appointments that begins with a "bid request." The LSA 305 publishes a "request bid" message to a capable MSA 310. The MSA 310 submits one or more bids to the LSA 305. The LSA 305 selects one from among several such bids, which typically results in one or more "appointments" associated with performing the operation the LSA 305 is seeking for its lot 130 of wafers 135. Note, however, that other protocols may be employed in which there is no "bid request." Thus, the bid request is an implementation specific feature that may not be found in all embodiments.

TABLE 3

Reactive Scheduling Activities for LSAs

| Event | Event Type | Reactive Scheduling Activities |
|---|---|---|
| Appointment End Time Alarm Fired For Move Appointment | Alarm Event | The alarm indicates that the scheduled end time of the move appointment has arrived. The LSA determines if the move appointment should be expanded. If the move originates from a machine port, move appointment expansion is always permitted to clear the port. Otherwise, the move appointment is expanded a percentage (i.e., 25%) of the originally scheduled duration until a maximum expansion percentage has been reached (i.e., 175%). When the maximum expansion percentage has been reached, the appointment is aborted. If the move appointment is expanded, subsequent booked appointments are shifted later in time. A new end time alarm is then set for the expanded move appointment. |
| Appointment End Time Alarm Fired For Feeder Appointment | Alarm Event | The alarm indicates that the scheduled end time of the feeder appointment has arrived. The LSA will expand the appointment by a configurable percentage. Any subsequent feeder appointments (if any) will be shrunk by the amount that this feeder appointment expanded (can't shrink a feeder duration to be less than the process time for the operation). As a last resort, appointments after the final feeder appointment will be shifted to a later time. |
| Appointment Start Time Arrived For Move Appointment | Alarm Event | This alarm indicates that the scheduled start time of the specified move appointment has occurred. The LSA will make the appointment active if it is not active and the AMHS move will be initiated. If the appointment is the final move before a lot appointment, the LSA will ask a MSA to reserve a port and lock the appointment. It will also appropriately update the total transport time and remaining transport time. The LSA will then create an appointment end time alarm. |
| Appointment Start Time Arrived For Feeder Appointment: | Alarm Event | This alarm indicates that the scheduled start time of the specified feeder appointment has occurred. The LSA will make the appointment active if it is not active. The LSA will then create an appointment end time alarm. |
| Lot Appointment Cancelled | Appointment State Change | The LSA cancels the lot appointment and any non-active moves associated with the lot appointment. It will also cancel all load and unload appointments associated with the lot appointment and appropriately cancel any alarms as necessary. The LSA then reschedules the cancelled appointment(s). |
| Expand Lot Appointment | Appointment State Change | The MSA initiates this change when the lot appointment is running long. The LSA will react to this change by shifting all appointments to the right, or later in time, after the lot processing appointment being expanded. It will then expand the lot appointment to the specified time. |
| Make Lot Appointment Aborted | Appointment State Change | The MSA initiates this change when the processing of the lot has been interrupted. The LSA will change the status of the appointment to aborted, put the lot on hold, and schedule a move appointment to a sorter or a stocker after canceling all appointments. |
| Make Unload Appointment Aborted | Appointment State Change | The LSA will change the status of the unload appointment to aborted. |
| Make Load Appointment Aborted | Appointment State Change | The LSA will change the status of the load appointment to aborted. |
| Make Lot Appointment Processing | Appointment State Change | The MSA initiates this change when the processing of the lot has started. The LSA will change appointment to the processing status, inform the lot processing agent to start processing the appointment. |
| Make Load Appointment Processing | Appointment State Change | The LSA will change appointment to the processing status, and inform the lot processing agent. |
| Make Unload Appointment Processing | Appointment State Change | The LSA will change appointment to the processing status, and inform the lot processing agent. |
| Make Lot Appointment Completed | Appointment State Change | The MSA initiates this change when the lot has completed processing and may shrink the appointment if appropriate. The LSA will notify the |

TABLE 3-continued

Reactive Scheduling Activities for LSAs

| Event | Event Type | Reactive Scheduling Activities |
|---|---|---|
| | | processing agent, change the status to completed, ensure that a post control move appointment has been scheduled, and, if not, it will create one. It initiates the next appointment. |
| Make Load Appointment Completed | Appointment State Change | The LSA will notify the processing agent and change the status to completed. It initiates the next appointment. |
| Make Unload Appointment Completed | Appointment State Change | The LSA will notify the processing agent and change the status to completed. It initiates the next appointment. |
| Make Move Appointment Completed | Appointment State Change | The LSA will make the appointment completed and may shrink the appointment if appropriate. It will also cancel the end time alarm, appropriately updates the transport start time, and initiates the next appointment. |
| Make Lot Appointment Near Complete | Appointment State Change | The MSA initiates this change when it receives an equipment event stating that the lot processing is near complete. The LSA will change the status of the appointment to near complete. It will then schedule the post control move appointment and invokes scheduling for the next process operation if appropriate. |
| Shift Lot Appointment Left | Appointment State Change | The LSA will try to move the lot appointment to the left, or earlier in time. If it is unable to shift left, the system will cancel all non-active move, load, and unload appointments and then cancels the lot appointment. |
| Shift Load Appointment Left | Appointment State Change | The LSA will try to move the load appointment to the left. If it is unable to shift left, the system will cancel all non-active move appointments, cancels unload/load appointments, cancels the lot appointment. |
| Shift Unload Appointment Left | Appointment State Change | The LSA will try to move the unload appointment to the left. If it is unable to shift left, the system will cancel all non-active move appointments, cancels unload/load appointments, and cancels the lot appointment. |
| Shift Lot Appointment Right | Appointment State Change | The LSA will check to see if the first appointment is a move appointment. If it is a move appointment and it is not active or on a machine or machine port, it will shift that move appointment to make it arrive at the start of the lot appointment or load appointment (if the move appointment is active, it will expand the end to the start of the lot appointment or load appointment). It will then shift any preceding appointments to the right. If the system is unable to shift the appointments right, it will cancel all non-active move appointments, any load/unload appointment, and the lot appointment. |
| Shift Load Appointment Right | Appointment State Change | The LSA will check to see if the previous appointment is a move appointment. If it is a move appointment and it is not active or on a machine or machine port, it will shift that move appointment to make it arrive at the start of the load appointment (if the move appointment is active, it will expand the end to the start of the load appointment). It will then shift any preceding appointments to the right. If the system is unable to shift the appointments right, it will cancel all non-active move appointments, any load/unload appointments, and the lot appointment. |
| Shift Unload Appointment Right | Appointment State Change | The LSA will shift appointments to the right. If the system is unable to shift the appointments right, it will cancel the lot appointment, which will cancel all move, load, and unload appointments association with the lot appointment. |
| Shrink Lot Appointment | Appointment State Change | The LSA will shrink the lot appointment to the specified time and shift subsequent move appointments earlier in time. |
| Shrink Load Appointment | Appointment State Change | The LSA will shrink the load appointment to the specified time. |
| Shrink Unload Appointment | Appointment State Change | The LSA will shrink the unload appointment to the specified time. |
| Unscheduled Move Completed | Factory State Change (AMHS) | If the current location of the lot is a machine port, then the system will cancel all appointments except the lot appointment. The lot appointment will only |

TABLE 3-continued

Reactive Scheduling Activities for LSAs

| Event | Event Type | Reactive Scheduling Activities |
| --- | --- | --- |
| | | be cancelled if the appointment was for a different machine. If the appointment was for a different machine, the LSA will cancel all appointments and wait for the MSA to invoke override scheduling. Otherwise, the system will determine how long it will take for the lot to get back to the next processing appointment destination. If the lot can still make its processing start time, then the system will reschedule the appropriate move appointments. If the lot is unable to make the start time, it will cancel all move, load, unload, and lot appointments and will initiate scheduling. |
| Update Commitment Window For Lot Appointment | Appointment State Change | The LSA will update the lot appointment commitment window appropriately. The commitment window represents the lots earliest start time and latest delivery time for a given appointment. The commitment window is updated if an appointment is processing late and the new end time exceeds the latest delivery time of the appointment. |
| Update Load Time For Load Appointment | Appointment State Change | The LSA will update the load start time and remaining load time appropriately on the load appointment. |
| Wrong Move Completed | Appointment State Change | If the current location of the lot is a machine port, then the system will cancel all appointments except for the lot appointment. The lot appointment will only be cancelled if the appointment was for a different machine. If the appointment was for a different machine, the LSA will cancel all appointments and wait for the MSA to invoke override scheduling. Otherwise, the system will determine how long it will take for the lot to get back to the next processing appointment destination. If the lot can still make its original processing start time, then the system will reschedule the appropriate move appointments. If the lot is unable to make the start time, it will cancel all move, load, unload, and lot appointments and will initiate scheduling. |
| Lot Due Date Change | Factory State Change (MES) | If the lot has a processing appointment active, cancel appointments after either current appointment or following unload appointment (if present). If the appointment is in "near complete" status and the next process operation is not a control operation or there is no next operation in the process, schedule a move appointment after the current lot processing appointment. Otherwise, attempt to schedule the next process operation. If the lot has a move appointment active and the move is to a machine port destination, cancel appointments after the following load appointment (if present) and following lot processing appointment. Otherwise, cancel all appointments after the move appointment and reschedule the current process operation. If the lot has a feeder appointment active, cancel all appointments after the feeder appointment and reschedule the next process operation. If the lot has a load appointment active, cancel appointments after the following lot appointment or load appointment (if present.) If the lot has an unload appointment active, cancel appointments after the current time. If the next operation is not a control operation or there are no more operations, schedule a move appointment after the unload appointment. Reschedule for the next process operation. If no appointments are active, cancel all future appointments and reschedule current process operation. |
| Lot put on Hold | Factory State Change (MES) | If lot is processing, cancel appointment after post move appointment. If lot is moving to control machine port, cancel all appointments after the move and schedule a move to the nearest stocker as soon as the lot arrives at the machine port. If unload appointment is processing, cancel all appointments after and schedule post move. If feeder appointment is processing, shrinks and aborts the appointment and |

TABLE 3-continued

Reactive Scheduling Activities for LSAs

| Event | Event Type | Reactive Scheduling Activities |
|---|---|---|
| | | then cancels all appointments after feeder appointment. If load appointment is processing, it cancels all appointments after except for the unload appointment. It will then schedule a post move appointment.<br>If the lot has a processing appointment active, and it is in a status of processing or near complete, it is allowed to complete. If the next appointment is an unload appointment, all subsequent appointments are cancelled and a move is scheduled after the unload. If the next appointment is a move appointment, it and subsequent appointments are cancelled and another move is scheduled. If there are no subsequent appointments, a move is scheduled after the processing appointment. If the lot appointment is active but not processing or complete, it is shrunk and aborted. If the next appointment is an unload appointment, subsequent appointments are cancelled and a move appointment is scheduled. If the next appointment is a move appointment, it is cancelled and another move appointment is scheduled. If there are no next appointments, a move appointment is scheduled.<br>If the lot is in a feeder appointment, it is shrunk and aborted and all subsequent appointments cancelled.<br>If the lot is in a load appointment and it is in a processing status, the subsequent lot processing appointment is cancelled. The following unload appointment is left and all subsequent appointments cancelled. A move appointment is scheduled after the unload appointment (both will later shift earlier in reaction to appointment changes initiated by the RSA). If the load appointment is not processing, it and subsequent appointments are cancelled and a move appointment is scheduled.<br>If the lot is in an unload appointment, all subsequent appointments are cancelled and a move appointment is scheduled after the unload appointment.<br>If the lot is in a move appointment and the move has started, all subsequent appointments are cancelled. If the move is to a machine port, a move is scheduled to subsequently transport the lot off the machine port.<br>If the lot is on a move appointment that has not started, the move appointment is aborted and all subsequent appointments cancelled. |
| Process Changed | Factory State Change (MES) | If the lot has a processing appointment active, cancel appointments after either current appointment or following unload appointment (if present). If the appointment is in "near complete" status and the next process operation is not a control operation or there is no next operation in the process, schedule a move appointment after the current lot processing appointment. If the appointment is near complete and the next operation is a control operation, attempt to schedule the next process operation. If the lot has a move appointment active and the move is to a machine port destination, cancel appointments after the following load and unload appointments (if present) and following lot processing appointment. Otherwise, cancel all appointments after the move appointment and reschedule the current process operation.<br>If the lot has a feeder appointment active, cancel all appointments after the feeder appointment and reschedule the next process operation as well as any preceding feeder appointments.<br>If the lot has a load appointment active, cancel appointments after the following unload appointment.<br>If the lot has an unload appointment active, cancel appointments after the current time. If the next operation is not a control operation or there are no more operations, schedule a move appointment after the unload appointment. Reschedule for the next process operation. If no appointments are active, |

TABLE 3-continued

Reactive Scheduling Activities for LSAs

| Event | Event Type | Reactive Scheduling Activities |
|---|---|---|
| | | cancel all future appointments and reschedule current process operation. |
| Process Operation Changed | Factory State Change (MES) | The LSA will remove all non-active appointments. The LSA will then check to see if the new process operation is a control or feeder process operation. If the process operation is a feeder, then the agent will schedule the next process operation. If the process operation is a control and the agent doesn't have an appointment for this process operation, it will schedule this process operation. If the lot has a processing appointment active, cancel appointments after either current appointment or following unload appointment (if present). If the appointment is in "near complete" status and the next process operation is not a control operation or there is no next operation in the process, schedule a move appointment after the current lot processing appointment. If the appointment is near complete and the next operation is a control operation, attempt to schedule the next process operation. If the lot has a move appointment active and the move is to a machine port destination, cancel appointments after the following load and unload appointments (if present) and following lot processing appointment. Otherwise, cancel all appointments after the move appointment and reschedule the current process operation. If the lot has a feeder appointment active, cancel all appointments after the feeder appointment and reschedule the next process operation as well as preceding feeder appointments. If the lot has a load appointment active, cancel appointments after the following unload appointment. If the lot has an unload appointment active, cancel appointments after the current time. If the next operation is not a control operation or there are no more operations, schedule a move appointment after the unload appointment. Reschedule for the next process operation. If no appointments are active, cancel all future appointments and reschedule current process operation. |
| Wafer Count Decreased | Factory State Change (MES) | If the wafer count for a lot decreases, the MSA shrinks lot appointments on its calendar that have not yet started. The MSA will try to shrink the appointment by the proper amount. The MSA cancels any unstarted lot aappointment that cannot be shrunk. The LSA subsequently reacts to the appointment changes made by the MSA, depending on the what the changes are. |
| Wafer Count Increased | Factory State Change (MES) | If the wafer count for a lot increases, the MSA expands lot appointments on its calendar that have not yet started. The MSA will try to expand the appointment by the proper amount. The MSA cancels any unstarted lot aappointment that cannot be expanded. The LSA subsequently reacts to the appointment changes made by the MSA, depending on the what the changes are. |
| Lot Terminated | Factory State Change (MES) | The system will cancel all appointments for the lot. |
| Lot Moved In | Factory State Change(MES) | If the lot moves in to a feeder operation that is not the first feeder operation of the segment, the LSA will adjust the appointment's end time to equal the current time plus the process time for that operation. It will then set an end time alarm. If the feeder operation is the last feeder, the LSA will replace the max move appointment with an appropriate move appointment and updates the remaining transport time. |
| Lot Moved Out | Factory State Change | If the operation that the lot changed from is a feeder operation, the LSA will completely shrink the feeder appointment and cancel subsequent feeder and maxMove appointments, and schedule the next operation and any preceding feeder appointments. If the operation that the lot changed from is a control |

TABLE 3-continued

Reactive Scheduling Activities for LSAs

| Event | Event Type | Reactive Scheduling Activities |
|---|---|---|
| | | operation, no action is taken (next operation would have been scheduled at near completion). If the operation the lot changed from is a normal (not control or feeder) operation, the LSA will schedule the operation to which the lot changed. |
| Experimental Request Form ("ERF") Status Change | Factory State Change (MES) | An ERF includes special instructions on how to process a particular lot. An ERF may be attached to or removed from a lot, and the LSA is notified when this happens. The LSA will notify each lot processing appointment's MSA and subsequently react to appointment state changes (if lot no longer compatible with any future batch appointments in which it may be participating). |
| Override Lot Appointment | Factory State Change | A bid request and an appointment change listener are created and returned to the MSA. (This is in response to an unscheduled lot being placed on a machine port.) |
| Machine Advertises a Time Slot | Appointment State Change | LSA will determine if it can improve its processing appointment for the operation at the new time slot. If so, then the LSA cancel the appointment and publishes a submit bid message in attempt to reschedule the appointment for the advertised time slot. |

TABLE 4

Reactive Scheduling Activities for PM Scheduling Agents

| Event | Event Type | Reactive Scheduling Activities |
|---|---|---|
| PM/Qual Appointment Cancelled | Appointment State Change | The PM appointment is canceled and rescheduled. |
| Expand PM/Qual Appointment | Appointment State Change | The MSA initiates this change when the PM appointment is running long. The PMSA will react to this change by shifting all appointments to the right of the PM processing appointment being expanded. The appointments that cannot be shifted are canceled and rescheduled. It will then expand the PM appointment to the specified time. |
| Make PM/Qual Appointment Aborted | Appointment State Change | The MSA initiates this change when the processing of the PM has been interrupted. The MSA will change the status of the appointment to aborted. The PMSA will reschedule the appointment. |
| Make PM/Qual Appointment Processing | Appointment State Change | The MSA initiates this change when the MSA learns the PM has started. The MSA will change appointment to a processing status. |
| Make PM/Qual Appointment Completed | Appointment State Change | The MSA initiates this change when the PM has completed processing and may shrink the appointment if appropriate. The PMSA will notify the processing agent, change the status to completed, and update the last occurrence of the PM with the current wafer count on the machine or current time. |
| Make PM Appointment Active PM/Qual | Appointment State Change | The MSA initiates this change when it is time for the following Qual to start. The PMSA will change the status of the appointment to "active". |
| Make PM Appointment Processing PM/Qual | Appointment State Change | The MSA initiates this change when it receives a Factory State Change indicating the Qual portion of the PM appointment has started. The PMSA will change the status of the appointment to processing PM/Qual. |
| Shift PM/Qual Appointment Left | Appointment State Change | The PMSA will try to move the PM appointment to the left. If it is unable to shift left, the system will cancel the appointment and reschedule it. |
| Shift PM/Qual Appointment Right | Appointment State Change | The PMSA will try to move the PM appointment to the right. If it is unable to shift right, the system will cancel the appointment and reschedule it. |

TABLE 4-continued

Reactive Scheduling Activities for PM Scheduling Agents

| Event | Event Type | Reactive Scheduling Activities |
|---|---|---|
| Shrink PM/Qual Appointment | Appointment State Change | The PMSA will shrink the PM appointment to the specified time. |
| Update Commitment Window For PM/Qual Appointment | Appointment State Change | The PM appointment commitment window is updated. The commitment window represents the PMs earliest start time and latest delivery time for a given appointment. |
| Override PM/Qual Appointment | Appointment State Change | The PM appointment is cancelled within the calendar if it exist. It will then create a bid request and appointment change listener and return it to the MSA. This is in response to an unscheduled PM being started. |
| MES Machine Event Detected | Factory State Change | The PMSA will appropriately update the number of occurrences of the event within any PM or Qual that depends on this event. It will then schedule any PMs or Quals triggered by the event occurrence what are not currently scheduled on its calendar. |
| Lot Processing Completed on Machine | Factory State Change | The PMSA will reevaluate the commitment windows for all PMs or Quals that are scheduled based on a count of material processed. If the commitment window is invalid, the PMSA will either update the commitment window if the PM or Qual is scheduled within the new window, or it will cancel the existing appointment and reschedule within the new window. It will also schedule any PMs or Quals based on a count of material processed that have reached their trigger point and have not been schedule previously. |
| Alarm Fired | Alarm Event | The PMSA will schedule any time-based PM or Qual that has reached its trigger point and was not previously scheduled. |

TABLE 5

Reactive Scheduling Activities for Resource Scheduling Agents

| Event | Event Type | Reactive Scheduling Activities |
|---|---|---|
| Appointment Start Time Alarm Fired for Load (Unload) Appointment | Alarm Event | This alarm indicates that the scheduled start time of the specified load (unload) appointment has arrived. The resource appointment scheduler will make the appointment active if it is not active. It will also create an appointment end time alarm if needed. The resource appointment scheduler will inform the processing agent to start processing the appointment. |
| Appointment Start Time Alarm Fired for Discharge Appointment | Alarm Event | This alarm indicates that the scheduled start time of the specified discharge appointment has arrived. The resource appointment scheduler will make the appointment active if it is not active. It will also create an appointment end time alarm if needed. The resource appointment scheduler will inform the processing agent to start processing the appointment. |
| Appointment End Time Alarm Fired for Load (Unload) Appointment | Alarm Event | This alarm indicates that the scheduled end time of the specified load (unload) appointment has arrived. The resource appointment scheduler will expand the appointment with a percentage (e.g., 25%) of the originally scheduled duration until a maximum expansion percentage has been reached (e.g., 175%). Before expanding the appointment, the subsequent booked appointments may be shifted later in time. A new end time alarm is then set for the expanded load (unload) appointment. |
| Appointment End Time Alarm Fired for Charge Appointment | Alarm Event | This alarm indicates that the scheduled end time of the specified charge appointment has arrived. The resource appointment scheduler will expand the appointment with a percentage (i.e., 25%) of the originally scheduled duration until a |

TABLE 5-continued

Reactive Scheduling Activities for Resource Scheduling Agents

| Event | Event Type | Reactive Scheduling Activities |
|---|---|---|
| | | maximum expansion percentage has been reached (i.e., 175%). Before expanding the appointment, the subsequent booked appointments may be shifted later in time. A new end time alarm is then set for the expanded charge appointment. |
| Machine Batch Appointment Changes Its Status to Active | Appointment State Change | The MSA initiates this change when the start time for the corresponding machine batch appointment has arrived. The RSA will change the corresponding appointment status of the current charge appointment to active, and a new end time alarm is set for the activated charge appointment. |
| Machine Batch Appointment Changes Its State to Processing | Appointment State Change | The MSA initiates this change when the machine batch appointment was actually started. The charge appointment will still have the active status. |
| Machine Batch Appointment Changes Its State to Completed | Appointment State Change | The MSA initiates this change when the processing of the corresponding machine batch appointment was actually completed. The RSA will change the appointment state of the corresponding discharge appointment to the completed status. |
| Lot Load (Unload) Appointment Shifted to Later Time | Appointment State Change | The LSA initiates this change when a lot load appointment was shifted to a later time. The RSA will rearrange its corresponding load appointments, and shift other appointments on its calendar if necessary. If the appointment has a start time alarm, the alarm update will be performed. |
| Machine Batch Appointment Shifted Right to Later Time | Appointment State Change | The MSA initiates this change or responding the change from the lot scheduling calendar when a machine batch appointment was shifted to later time. The RSA will shift the corresponding charge and discharge appointment to later time. Other appointments on its calendar may also get shifted. |
| Machine Batch Appointment Shrunk | Appointment State Change | The MSA initiates this change when a machine batch appointment was shrunk. If the discharge appointment is not activated, the RSA will shift the corresponding discharge appointment to earlier time, otherwise it will shrink the discharge appointment. The start time alarm or end time alarm for the discharge appointment may need to be updated. |
| Machine Batch Appointment Expanded | Appointment State Change | The MSA initiates this change when a machine batch appointment was expanded. If the discharge appointment is not activated, the RSA will shift the corresponding discharge appointment to later time, other wise it will expand the discharge appointment. The start time alarm or end time alarm for the discharge appointment may need to be updated. |
| Load Start | Factory State Change (EI) | The equipment interface ("EI") notifies the RSA that a load has started. The RSA reacts depending on whether the lots that were loaded were expected or unexpected. If all the lot are expected, but loading order is different from the appointments on the calendar, the RSA will rearrange its load appointment and their participants. |
| Carrier Arrived | Factory State Change | The EI notifies the RSA that a carrier has arrived. If it carries the expected lot, the RSA will change the corresponding resource load lot appointment state to the ready status. |
| Load Update | Factory State Change | Upon notification by the EI, if the corresponding load appointment is not the first one in the batch job, the RSA will first shrink the previous load appointment, and pull the follow-up load appointment to earlier start time, the appointment state of the previous load appointment will be changed to the completed status. The end time alarm for the previous load appointment will be cancelled. The PMSA will change the next load appointments status to active. |
| Load Completed | Factory State Change | Upon notification by the EI that a load has completed, the RSA will shrink the corresponding |

TABLE 5-continued

Reactive Scheduling Activities for Resource Scheduling Agents

| Event | Event Type | Reactive Scheduling Activities |
|---|---|---|
|  |  | load appointment, cancel the end time alarm and change the appointment state of the last load appointment to the completed status. |
| Charge Started | EI Event | Upon notification from the EI that charging has started, the RSA will change the charge appointment state to the processing status. |
| Charge Completed | EI Event | Upon notification from the EI that a charge is complete, the RSA will shrink the charge appointment, cancel the end time alarm, and change the charge appointment state to the completed status. If there are some follow-up unload appointments, it will pull the unload appointments to earlier start time, and start the unload appointment. |
| Discharge Started | EI Event | Upon notification from the EI that a discharge has started, the RSA will change the discharge appointment state to the processing status |
| Unload Started | EI Event | Upon notification from the EI that unloading has started, the RSA will change the first unload appointment state to the processing status. |
| Unload Update | EI Event | Upon notification from the EI, an unload appointment is updated. If the corresponding unload appointment is not the last one in the unload start event, the RSA will shrink the corresponding unload appointment, cancel its end time alarm and change its status to the completed status. The RSA will then pull the next unload appointment to earlier time and start processing the next unload appointment. If the corresponding unload appointment is the last one in the unload start event, the RSA will wait for unload completed event. |
| Unload Completed | EI Event | Upon notification from the EI that an unload has completed, the RSA will shrink the unload appointment, cancel its end time alarm and change the appointment state to the completed status. |
| Unexpected Unload Started | EI Event | Upon notification from the EI that an unload has unexpectedly started (i.e., the next appointment is not an unload appointment or the transfer sequence is different from the scheduled one) the RSA will change the scheduled unload appointments, and make the first one active. Overlapping appointment may get shifted to later time or cancelled. |
| Unexpected Load Started | EI Event | Upon notification from the EI that a load has unexpectedly started (i.e., the next appointment is not a load appointment or the transfer sequence is different from the scheduled one), if there is a lot in the list that is not one of the participant of the next charge appointment, the RSA passes a lot list and batch ID to a MSA for appropriate response. If all the lots are in the next charge appointment, but the transfer sequence is different from the schedule appointments, the RSA will reschedule the load appointments. |

Note that, as booked appointments are shifted, canceled, shrunk, expanded, and rescheduled, the changes can ripple through the process flow and, in particular, the calendars. Changes are instituted by a single software agent, but a changed appointment may be booked on multiple calendars. The changes must consequently be communicated to the other software agents so they can update their calendars respectively. This is true also of other types of events in the process flow.

In the illustrated embodiment, the invention is implemented using object oriented programming ("OOP") techniques, although the invention may be implemented using techniques that are not object oriented. The software agents 265 are implemented as objects and are intelligent, state aware, and are imbued with specific goals for which they autonomously initiate behaviors to achieve. Their behavior is relatively simple and is partially configurable through scripts and properties. The behavior is designed to achieve selected goals such as achieving an assigned lot due date, achieving a predefined level of quality, maximizing machine utilization, and scheduling opportunistic preventive maintenance. The helper class is a class of objects to which various objects that are software agents 265 delegate various responsibilities or that provide some useful service in the process flow 100. Publishers and listeners, mentioned above, are also helper class objects.

Thus, some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

This concludes the detailed description. The particular embodiments disclosed above are illustrative only, as the invention may be modified and practiced in different but equivalent manners apparent to those skilled in the art having the benefit of the teachings herein. Note that further variations not discussed may be employed in still other embodiments. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for scheduling in an automated manufacturing environment, comprising:
   detecting an occurrence of a predetermined event in a process flow;
   notifying a software scheduling agent of the occurrence; and
   reactively scheduling an action from the software scheduling agent responsive to the detection of the predetermined event.

2. The method of claim 1, wherein detecting the occurrence of the predetermined event includes detecting an unplanned event or an unexpected event.

3. The method of claim 1, wherein detecting the occurrence of the predetermined event includes detecting an occurrence of one of an appointment state change, a factory state change, and an alarm event.

4. The method of claim 3, wherein detecting the appointment state change includes detecting at least one of an appointment cancellation, an appointment expansion, an appointment shrinking, an appointment abort, an appointment changing status, an appointment shift, an appointment override, an transport time update, a load time update, an unload time update, a lot joining a batch, a lot leaving a batch, canceling a lot from a batch, and a commitment window update.

5. The method of claim 3, wherein detecting the factory state change includes detecting at least one of detection of a downtime occurrence; a machine becoming available; a PM/Qual being detected; a chamber going down; a chamber becoming available, a change in machine capabilities; a change in machine types; an addition of a process; an addition of a process operation; a lot arriving at a machine; a lot process changed, a lot placed on hold, a lot released from hold, a lot priority changed, a lot due date changed, a lot wafer count changed, a lot process operation changed, and a lot departing a machine.

6. The method of claim 3, wherein detecting the alarm event includes detecting at least one of an alarm firing for an appointment start time and an alarm firing for an appointment end time.

7. The method of claim 1, wherein detecting the predetermined event includes detecting at least one of an appointment cancellation, an appointment expansion, an appointment shrinking, an appointment abort, an appointment becoming active, an appointment nearing completion, an appointment completing, an appointment shift, an appointment override, and a commitment window update, detection of a downtime occurrence; a machine becoming available; a PM/Qual being detected; a chamber going down; a chamber becoming available, a change in machine capabilities; a change in machine types; an addition of a process; an addition of a process operation; a lot arriving at a machine; a lot process changed, a lot placed on hold, a lot released from hold, a lot priority changed, a lot due date changed, a lot wafer count changed, a lot process operation changed, a lot departing a machine, an alarm firing for an appointment start time and an alarm firing for an appointment end time.

8. The method of claim 1, wherein notifying the software scheduling agent of the occurrence includes:
   sending an indication of the occurrence to a publisher;
   publishing the occurrence from the publisher to a subscribing listener; and
   calling the software scheduling agent from the subscribing listener.

9. The method of claim 1, wherein reactively scheduling the action includes at least one of aborting a scheduled appointment in progress; canceling a scheduled appointment before it begins; scheduling a new appointment; starting a scheduled appointment; expanding the duration of a scheduled appointment; shrinking the duration of a scheduled appointment; shifting a scheduled appointment; adding new processing capabilities; deleting old processing capabilities; setting an alarm; canceling an alarm; and changing the status of an appointment.

10. The method of claim 1, further comprising proactively scheduling an appointment with which the predetermined event is associated.

11. The method of claim 10, wherein proactively scheduling the appointment includes proactively scheduling the appointment from the software scheduling agent.

12. A computer-readable, program storage medium encoded with instructions that, when executed by a computer, perform a method for scheduling in an automated manufacturing environment, the method comprising:

detecting an occurrence of a predetermined event in a process flow;

notifying a software scheduling agent of the occurrence; and reactively scheduling an action from the software scheduling agent responsive to the detection of the predetermined event.

13. The program storage medium of claim 12, wherein detecting the occurrence of the predetermined event in the encoded method includes detecting an unplanned event or an unexpected event.

14. The program storage medium of claim 12, wherein detecting the occurrence of the predetermined event in the encoded method includes detecting an occurrence of one of an appointment state change, a factory state change, and an alarm event.

15. The program storage medium of claim 12, wherein detecting the predetermined event in the encoded method includes detecting at least one of an appointment cancellation, an appointment expansion, an appointment shrinking, an appointment abort, an appointment changing status, an appointment shift, an appointment override, an transport time update, a load time update, an unload time update, a lot joining a batch, a lot leaving a batch, canceling a lot from a batch, a commitment window update, detection of a downtime occurrence; a machine becoming available; a PM/Qual being detected; a chamber going down; a chamber becoming available, a change in machine capabilities; a change in machine types; an addition of a process; an addition of a process operation; a lot arriving at a machine; a lot process changed, a lot placed on hold, a lot released from hold, a lot priority changed, a lot due date changed, a lot wafer count changed, a lot process operation changed, a lot departing a machine, an alarm firing for an appointment start time and an alarm firing for an appointment end time.

16. The program storage medium of claim 12, wherein notifying the software scheduling agent of the occurrence in the encoded method includes:

sending an indication of the occurrence to a publisher;

publishing the occurrence from the publisher to a subscribing listener; and calling the software scheduling agent from the subscribing listener.

17. The program storage medium of claim 12, wherein reactively scheduling the action in the encoded method includes at least one of aborting a scheduled appointment in progress; canceling a scheduled appointment before it begins; scheduling a new appointment; starting a scheduled appointment; expanding the duration of a scheduled appointment; shrinking the duration of a scheduled appointment; shifting a scheduled appointment; adding new processing capabilities; deleting old processing capabilities; setting an alarm; canceling an alarm; and changing the status of an appointment.

18. The program storage medium of claim 12, wherein the encoded method further comprises proactively scheduling an appointment with which the predetermined event is associated.

19. A computing system programmed to perform a method for scheduling in an automated manufacturing environment, the method comprising:

detecting an occurrence of a predetermined event in a process flow;

notifying a software scheduling agent of the occurrence; and reactively scheduling an action from the software scheduling agent responsive to the detection of the predetermined event.

20. The computing system of claim 19, wherein detecting the occurrence of the predetermined event in the programmed method includes detecting an unplanned event or an unexpected event.

21. The computing system of claim 19, wherein detecting the occurrence of the predetermined event in the programmed method includes detecting an occurrence of one of an appointment state change, a factory state change, and an alarm event.

22. The computing system of claim 19, wherein detecting the predetermined event in the programmed method includes detecting at least one of an appointment cancellation, an appointment expansion, an appointment shrinking, an appointment abort, an appointment changing status, an appointment shift, an appointment override, an transport time update, a load time update, an unload time update, a lot joining a batch, a lot leaving a batch, canceling a lot from a batch, a commitment window update, detection of a downtime occurrence; a machine becoming available; a PM/Qual being detected; a chamber going down; a chamber becoming available, a change in machine capabilities; a change in machine types; an addition of a process; an addition of a process operation; a lot arriving at a machine; a lot process changed, a lot placed on hold, a lot released from hold, a lot priority changed, a lot due date changed, a lot wafer count changed, a lot process operation changed, a lot departing a machine, an alarm firing for an appointment start time and an alarm firing for an appointment end time.

23. The computing system of claim 19, wherein notifying the software scheduling agent of the occurrence in the programmed method includes:

sending an indication of the occurrence to a publisher;

publishing the occurrence from the publisher to a subscribing listener; and calling the software scheduling agent from the subscribing listener.

24. The computing system of claim 19, wherein reactively scheduling the action in the programmed method includes at least one of aborting a scheduled appointment in progress; canceling a scheduled appointment before it begins; scheduling a new appointment; starting a scheduled appointment; expanding the duration of a scheduled appointment; shrinking the duration of a scheduled appointment; shifting a scheduled appointment; adding new processing capabilities; deleting old processing capabilities; setting an alarm; canceling an alarm; and changing the status of an appointment.

25. The computing system of claim 19, wherein the encoded method further comprises proactively scheduling an appointment with which the predetermined event is associated.

26. An apparatus for scheduling in an automated manufacturing environment, the apparatus comprising:

means for detecting an occurrence of a predetermined event in a process flow;

means for notifying a software scheduling agent of the occurrence; and means for reactively scheduling an action from the software scheduling agent responsive to the detection of the predetermined event.

27. The method of claim 26, wherein the means for detecting the occurrence of the predetermined event includes means for detecting an unplanned event or an unexpected event.

28. The method of claim 26, wherein the means for detecting the occurrence of the predetermined event includes means for detecting an occurrence of one of an appointment state change, a factory state change, and an alarm event.

29. The method of claim 26, wherein the means for detecting the predetermined event includes means for detecting at least one of an appointment cancellation, an appointment expansion, an appointment shrinking, an appointment abort, an appointment changing status, an appointment shift, an appointment override, an transport time update, a load time update, an unload time update, a lot joining a batch, a lot leaving a batch, canceling a lot from a batch, a commitment window update, detection of a downtime occurrence; a machine becoming available; a PM/Qual being detected; a chamber going down; a chamber becoming available, a change in machine capabilities; a change in machine types; an addition of a process; an addition of a process operation; a lot arriving at a machine; a lot process changed, a lot placed on hold, a lot released from hold, a lot priority changed, a lot due date changed, a lot wafer count changed, a lot process operation changed, a lot departing a machine, an alarm firing for an appointment start time and an alarm firing for an appointment end time.

30. The method of claim 26, wherein the means for notifying the software scheduling agent of the occurrence includes:
    means for sending an indication of the occurrence to a publisher;
    means for publishing the occurrence from the publisher to a subscribing listener; and
    means for calling the software scheduling agent from the subscribing listener.

31. The method of claim 26, wherein the means for reactively scheduling the action includes means for at least one of aborting a scheduled appointment in progress; canceling a scheduled appointment before it begins; scheduling a new appointment; starting a scheduled appointment; expanding the duration of a scheduled appointment; shrinking the duration of a scheduled appointment; shifting a scheduled appointment; adding new processing capabilities; deleting old processing capabilities; setting an alarm; canceling an alarm; and changing the status of an appointment.

32. The method of claim 26, further comprising means for proactively scheduling an appointment with which the predetermined event is associated.

33. An automated manufacturing environment, comprising:
    a process flow; and
    a computing system, including a plurality of software scheduling agents residing thereon, the software scheduling agents being capable of reactively scheduling appointments for activities in the process flow responsive to a plurality of predetermined events.

34. The automated manufacturing environment of claim 33, further comprising a plurality of publishers and subscribers capable of detecting an occurrence of one of the predetermined events in the process flow and notifying one of the software scheduling agent of the occurrence.

35. The automated manufacturing environment of claim 34, wherein detecting the occurrence of the predetermined event includes detecting an unplanned event or an unexpected event.

36. The automated manufacturing environment of claim 34, wherein detecting the occurrence of the predetermined event includes detecting an occurrence of one of an appointment state change, a factory state change, and an alarm event.

37. The automated manufacturing environment of claim 34, wherein detecting the predetermined event includes detecting at least one of an appointment cancellation, an appointment expansion, an appointment shrinking, an appointment abort, an appointment changing status, an appointment shift, an appointment override, an transport time update, a load time update, an unload time update, a lot joining a batch, a lot leaving a batch, canceling a lot from a batch, a commitment window update, detection of a downtime occurrence; a machine becoming available; a PM/Qual being detected; a chamber going down; a chamber becoming available, a change in machine capabilities; a change in machine types; an addition of a process; an addition of a process operation; a lot arriving at a machine; a lot process changed, a lot placed on hold, a lot released from hold, a lot priority changed, a lot due date changed, a lot wafer count changed, a lot process operation changed, and a lot departing a machine, an alarm firing for an appointment start time and an alarm firing for an appointment end time.

38. The automated manufacturing environment of claim 34, wherein notifying the software scheduling agent of the occurrence includes:
    sending an indication of the occurrence to a publisher;
    publishing the occurrence from the publisher to a subscribing listener; and
    calling the software scheduling agent from the subscribing listener.

39. The automated manufacturing environment of claim 34, wherein reactively scheduling the action includes at least one of aborting a scheduled appointment in progress; canceling a scheduled appointment before it begins; scheduling a new appointment; starting a scheduled appointment; expanding the duration of a scheduled appointment; shrinking the duration of a scheduled appointment; shifting a scheduled appointment; adding new processing capabilities; deleting old processing capabilities; setting an alarm; canceling an alarm; and changing the status of an appointment.

40. The automated manufacturing environment of claim 34, further comprising proactively scheduling an appointment with which the predetermined event is associated.

41. The automated manufacturing environment of claim 33, further comprising at least one of a manufacturing execution system and an automated materials handling system.

42. The automated manufacturing environment of claim 33, wherein the computing system is at least one of a local area network, a wide area network, a system area network, an intranet, or a portion of the Internet.

43. The automated manufacturing environment of claim 33, wherein the process flow comprises a portion of a semiconductor manufacturing facility.

44. An automated manufacturing environment, comprising:
    a plurality of work pieces;
    a plurality of processing stations through which the work pieces may be processed;
    a plurality of software scheduling agents capable of scheduling appointments for processing the work pieces through the process stations, the software scheduling agents capable of reactively scheduling responsive to predetermined events.

45. The automated manufacturing environment of claim 44, further comprising a plurality of publishers and subscribers capable of detecting an occurrence of one of the predetermined events in the process flow and notifying one of the software scheduling agent of the occurrence.

46. The automated manufacturing environment of claim 45, wherein detecting the occurrence of the predetermined event includes detecting an unplanned event or an unexpected event.

47. The automated manufacturing environment of claim 45, wherein detecting the occurrence of the predetermined event includes detecting an occurrence of one of an appointment state change, a factory state change, and an alarm event.

48. The automated manufacturing environment of claim 45, wherein detecting the predetermined event includes detecting at least one of an appointment cancellation, an appointment expansion, an appointment shrinking, an appointment abort, an appointment changing status, an appointment shift, an appointment override, an transport time update, a load time update, an unload time update, a lot joining a batch, a lot leaving a batch, canceling a lot from a batch, a commitment window update, detection of a downtime occurrence; a machine becoming available; a PM/Qual being detected; a chamber going down; a chamber becoming available, a change in machine capabilities; a change in machine types; an addition of a process; an addition of a process operation; a lot arriving at a machine; a lot process changed, a lot placed on hold, a lot released from hold, a lot priority changed, a lot due date changed, a lot wafer count changed, a lot process operation changed, a lot departing a machine, an alarm firing for an appointment start time and an alarm firing for an appointment end time.

49. The automated manufacturing environment of claim 45, wherein notifying the software scheduling agent of the occurrence includes:

sending an indication of the occurrence to a publisher;
publishing the occurrence from the publisher to a subscribing listener; and
calling the software scheduling agent from the subscribing listener.

50. The automated manufacturing environment of claim 45, wherein reactively scheduling the action includes at least one of aborting a scheduled appointment in progress; canceling a scheduled appointment before it begins; scheduling a new appointment; starting a scheduled appointment; expanding the duration of a scheduled appointment; shrinking the duration of a scheduled appointment; shifting a scheduled appointment; adding new processing capabilities; deleting old processing capabilities; setting an alarm; canceling an alarm; and changing the status of an appointment.

51. The automated manufacturing environment of claim 45, further comprising proactively scheduling an appointment with which the predetermined event is associated.

52. The automated manufacturing environment of claim 44, further comprising at least one of a manufacturing execution system and an automated materials handling system.

53. The automated manufacturing environment of claim 44, wherein the computing system is at least one of a local area network, a wide area network, a system area network, an intranet, or a portion of the Internet.

* * * * *